(12) United States Patent
Nitsch et al.

(10) Patent No.: US 11,004,048 B2
(45) Date of Patent: May 11, 2021

(54) INTEGRATED CUSTOMER EXPERIENCE FUNCTIONALITY IN POINT OF SALE

(71) Applicant: Shopify Inc., Ottawa (CA)

(72) Inventors: Peter Nitsch, Toronto (CA); Polly Auyeung, Toronto (CA); Rahil Abdul Aziz, Toronto (CA); Ricardo Vazquez, Oakville (CA); Dima Bart, Milton (CA); Fahd Ananta, Toronto (CA)

(73) Assignee: Shopify Inc., Ottawa (CA)

( * ) Notice: Subject to any disclaimer, the term of this patent is extended or adjusted under 35 U.S.C. 154(b) by 56 days.

(21) Appl. No.: 16/228,893

(22) Filed: Dec. 21, 2018

(65) Prior Publication Data

US 2020/0202321 A1    Jun. 25, 2020

(51) Int. Cl.
*G06Q 20/20* (2012.01)
*G06Q 30/02* (2012.01)
*G06Q 10/10* (2012.01)

(52) U.S. Cl.
CPC .......... *G06Q 20/20* (2013.01); *G06Q 10/109* (2013.01); *G06Q 30/0201* (2013.01); *G06Q 30/0202* (2013.01)

(58) Field of Classification Search
CPC .. G06Q 20/20; G06Q 10/109; G06Q 30/0201; G06Q 30/0202; G06Q 10/00

USPC ............ 705/16, 21, 26.1, 7.25, 7.31, 39, 44
See application file for complete search history.

(56) References Cited

U.S. PATENT DOCUMENTS

| | | | |
|---|---|---|---|
| 2006/0031110 A1* | 2/2006 | Benbassat | G06Q 10/06 705/7.14 |
| 2009/0281843 A1* | 11/2009 | Coffman | G06Q 10/1093 705/5 |
| 2013/0060679 A1* | 3/2013 | Oskolkov | G06Q 20/223 705/39 |
| 2016/0055215 A1* | 2/2016 | Kauwe | G06F 16/284 707/722 |
| 2016/0300192 A1* | 10/2016 | Zamer | G06Q 30/0633 |
| 2018/0013890 A1* | 1/2018 | Surridge | H04M 3/5233 |
| 2018/0341926 A1* | 11/2018 | Gentzkow | G06Q 10/06311 |
| 2019/0332785 A1* | 10/2019 | AthuluruTlrumala | G06F 21/604 |

* cited by examiner

*Primary Examiner* — Vanel Frenel
(74) *Attorney, Agent, or Firm* — GTC Law Group PC & Affiliates

(57) ABSTRACT

A computer-implemented method and system for a customer experience resource facility for scheduling a time-based resource on a commerce processing device and accepting an input for a product-based resource, and processing a payment in respect of the time-based resource and the product-based resource using a payment processing facility on the commerce processing device, where the payment processing facility processes payments through the commerce processing device based at least in part on an input received from the customer experience resource facility.

30 Claims, 37 Drawing Sheets

FIG. 2

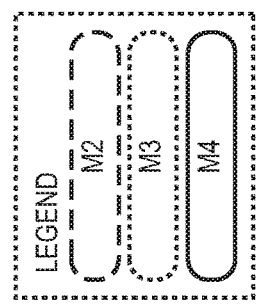
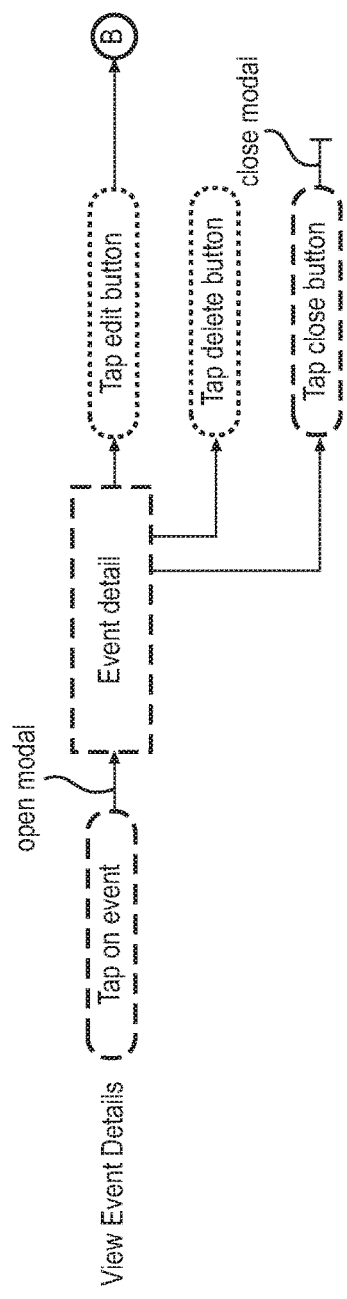
FIG. 5C

|  | 8:45 AM |
|  | Thu, May 31 ▾ |

Thu
31

9:00am-9:30am
Jane Doe #1
The Custom Organic Facial

9:30am-10:00am
John Doe #1
The Custom Organic Facial

11:00am-12:00pm
Jane Doe #2
Haircut and Style

12:00pm-12:15pm
Lunch Break

12:15pm-12:30pm
John Doe #2
Beard Trim

June

Fri
1

12:00pm-12:15pm
Lunch Break

🛒 Checkout    📅 Calendar    👤 Customers    📥 Orders    🏪 Store

Agenda - initial load

6:15 PM
Fri, Jun 1 ▾
100% ▰

12:00pm-12:15pm
Lunch Break

12:30pm-1:30pm
John Doe #3
Haircut and Style

1:30pm-2:30pm
John Doe #4
Haircut and Style

Sat 2

12:00pm-12:15pm
Lunch Break

Sun 3

1:30pm-2:30pm
DIY Facial Workshop
John Doe #5, John Doe #6, Jane Doe #3, Jane Doe #4

Mon 4

12:00pm-12:15pm
Lunch Break

Tue 5

12:00pm-12:15pm

Checkout    Calendar    Customers    Orders    Store

Agenda - scroll to future

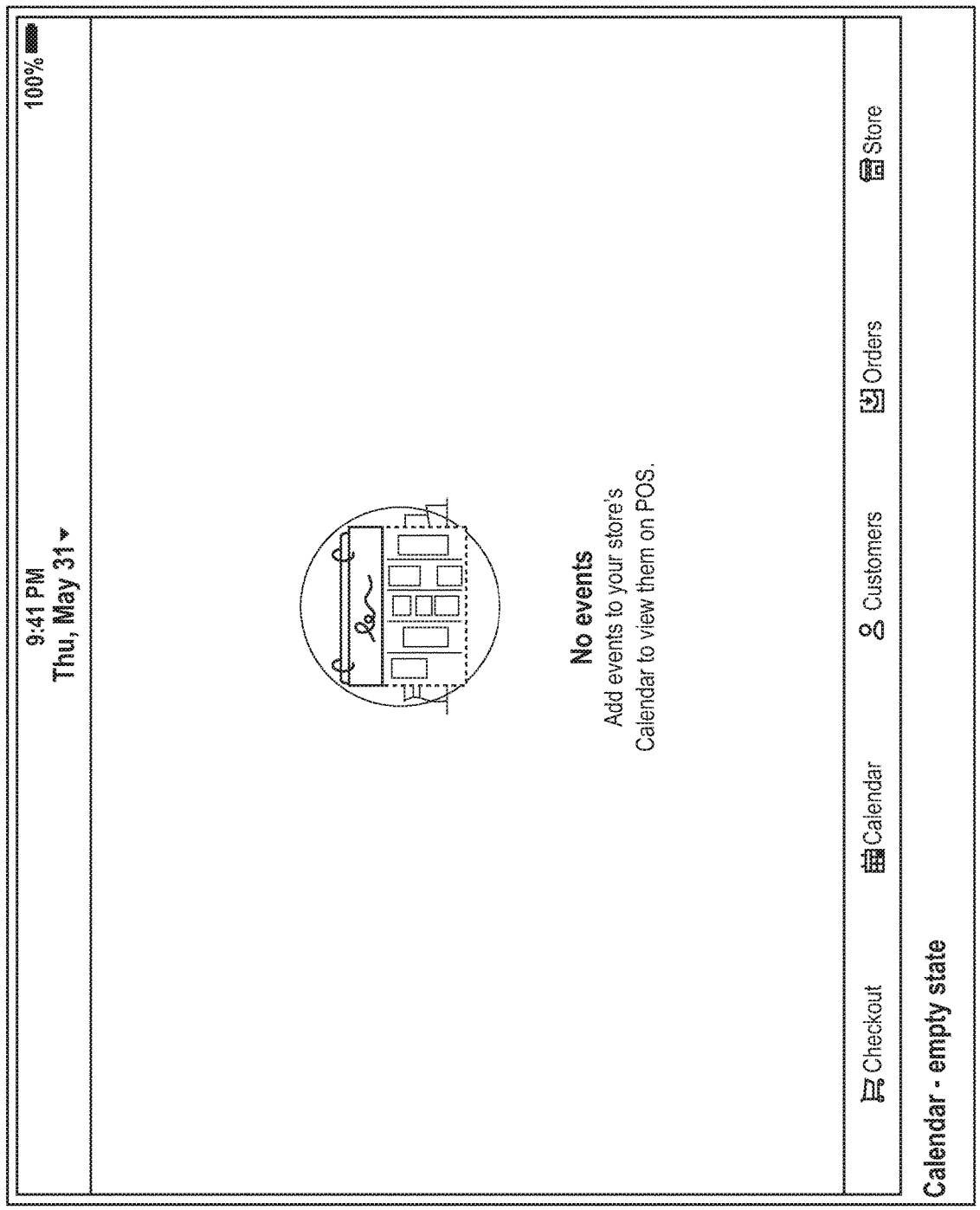

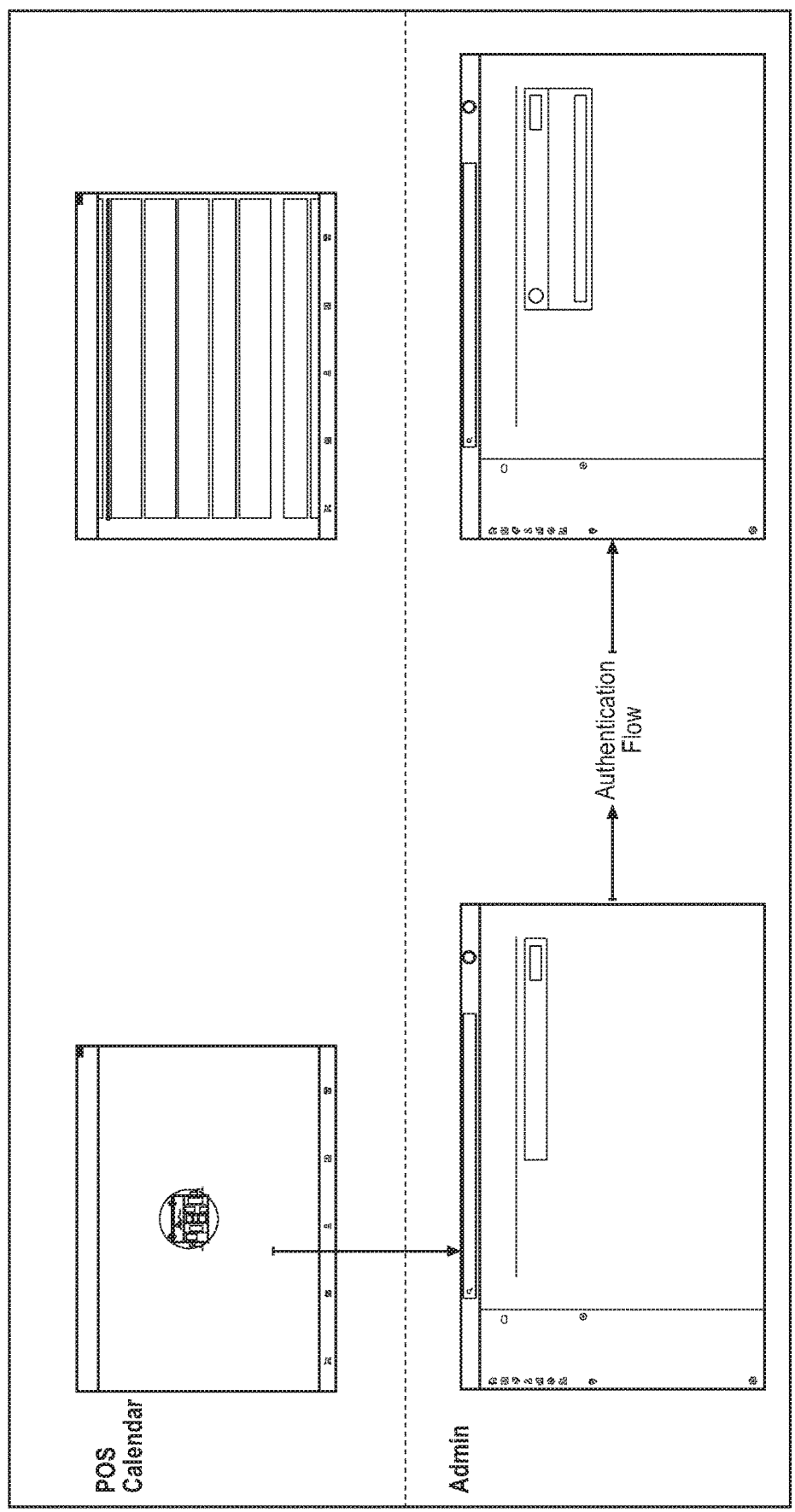

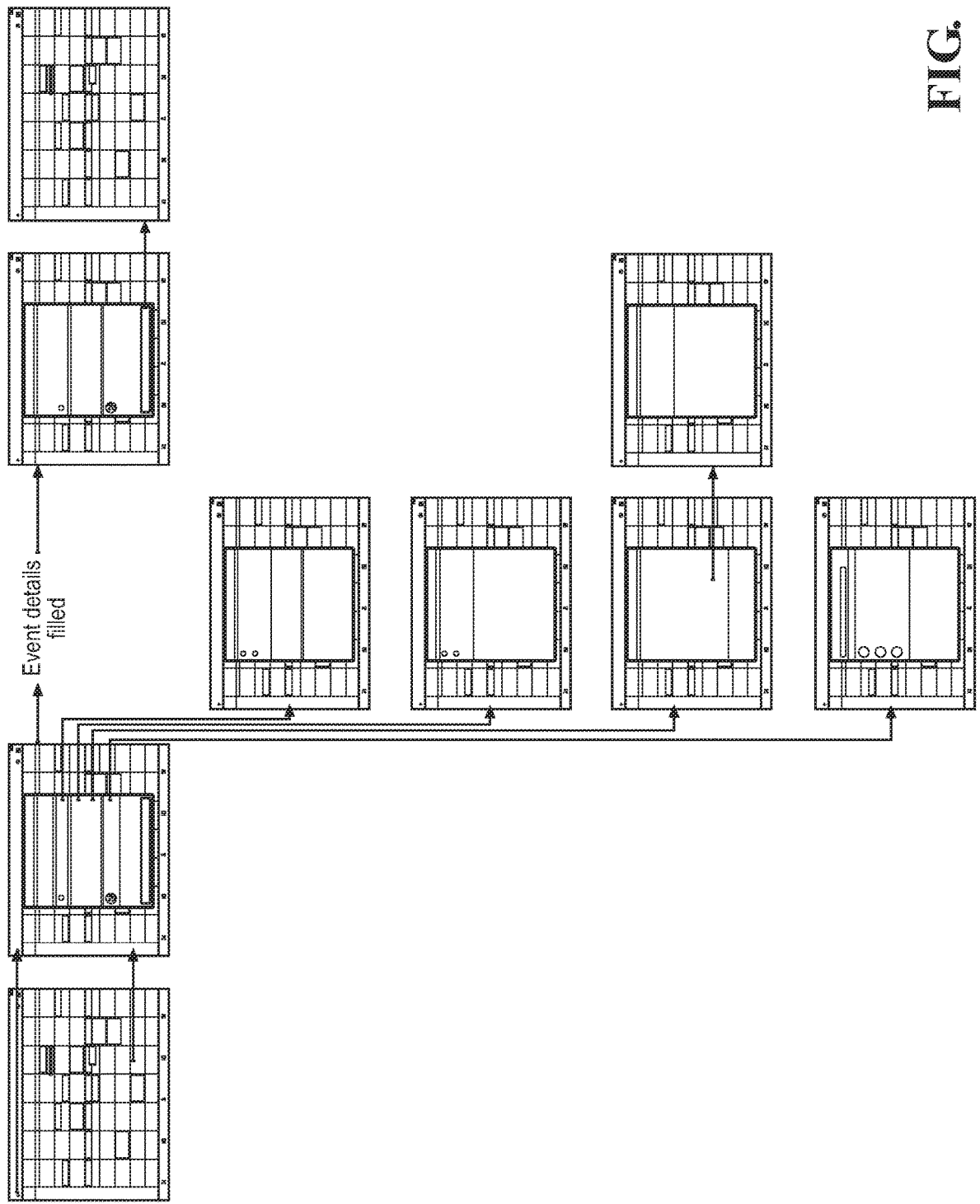

Calender > Agenda

Calendar > Agenda > Detail

Tuesday, May 1st

This week

| | 01<br>Tue | 02<br>Wed | 03<br>Thu |
|---|---|---|---|
| 12 PM | | John Doe #3<br>Custom Organic Facial | John Doe #16<br>Custom Organic Facial |
| 1 PM | John Doe #11<br>Haircut & Style - Gents | Jane Doe #2<br>Custom Organic Facial | |
| 2 PM | Jane Doe #1<br>Custom Organic Facial | John Doe #13<br>Haircut & Style - Gents | |
| 3 PM | John Doe #1<br>Custom Organic Facial | | John Doe #4<br>Custom Organic Facial |
| 4 PM | | | |
| 5 PM | John Doe #12<br>Haircut & Style - Gents | John Doe #14<br>Haircut & Style - Gents<br>John Doe #15<br>Haircut & Style - Gents | Jane Doe #6<br>Custom French Manicure |
| 6 PM | | | |
| 7 PM | | | |

9:41 AM

< Back

Customer

John Doe #1
john.doe@shop.com

Insights

Visits this year    17 visits

Preferred product    Protect Face Balm

Third insight    Value

Upcoming appointments

The Organic Custom Facial    July 7th, 2:00pm

Organic French Manicure    July 16, 10:30am

Past orders

May 4th, 2018    $209.24

Checkout    Calendar    Orders    Store

Timeline

☑ Show Comments

| Leave a comment... |
| © @ # 🔗 |
| Post |

Only you and other staff can see comments

TODAY

Jane Doe #7 added a note to this customer — 4:13pm

Point of Sale sent an order receipt email for order #1-1322 to this customer (johndoe@shop.com) — 4:10pm Jane Doe #7 processed order #1-1322 for this customer on POS — 4:09pm Jane Doe #7 checked-in this customer for appointment #S63F82 on POS — 2:30pm

APRIL 22

Appointments sent a reminder for appointment #S63F82 to this customer (johndoe@shop.com) — 9:00am

APRIL 22

Jane Doe #8 created appointment #S63F82 for this customer on POS — 3:19pm

Point of Sale added the email johndoe@shop.com to this customer — 3:19pm

| Products | |
|---|---|
| 🏷 Protect + Restore Face Balm | $45.00 |
| 🏷 Skin Reset Program | $129.99 |
| 🏷 Try-me Kit | $14.99 |
| 🏷 Lover's Kit | $64.99 |
| 🏷 Lover's Oil | $39.99 |
| 🏷 Moisturizing Cleanser | $39.99 |
| 🏷 Essential Massage Oil | $54.99 |
| 🏷 Rejuvenating Serum | $74.99 |
| 🏷 West Coast Salt Scrub | $24.99 |

FIG. 12K

INTEGRATED CUSTOMER EXPERIENCE FUNCTIONALITY IN POINT OF SALE

FIELD

The present disclosure relates generally to functionality associated with commerce point-of-sale, and more particularly to integrating multiple dimensions of customer experience functionality into point-of-sale functionality, including a POS device.

BACKGROUND

Dimensions of managing a customer interaction are typically accommodated through multiple applications, such as for appointment scheduling, payment processing, personnel management, facility scheduling, and the like, causing inefficiencies by forcing a merchant to operate simultaneously in multiple applications to satisfy the needs of managing a customer experience, including the payment processing aspect traditionally provided at point-of-sale.

Therefore, there is a need in the art for methods and systems that support integration within a point-of-sale process for the multiple functional dimensions associated with managing a customer experience.

SUMMARY

In an aspect, a computer-implemented method may include scheduling, using a customer experience resource facility on a commerce processing device, a time-based resource; accepting, using the customer experience resource facility on the commerce processing device, an input for a product-based resource; and processing a payment in respect of the time-based resource and the product-based resource using a payment processing facility on the commerce processing device, wherein the payment processing facility processes payments through the commerce processing device based at least in part on an input received from the customer experience resource facility.

In an aspect, a system may include a commerce processing device for scheduling a time-based resource using a customer experience resource facility, the commerce processing device configured to store a set of instructions that, when executed, cause the commerce processing device to: accept, using the customer experience resource facility on the commerce processing device, an input for a product-based resource; and process a payment in respect of the time-based resource and the product-based resource using a payment processing facility on the commerce processing device, wherein the payment processing facility processes payments through the commerce processing device based at least in part on an input received from the customer experience resource facility.

In an aspect, a computer-implemented method for a merchant interface may include accepting an input, through a merchant user interface of a commerce processing device displaying a customer experience resource facility, of scheduling information for a time-based resource; accepting an input, through the merchant user interface of the commerce processing device displaying the customer experience resource facility, of scheduling information for a product-based resource; and displaying, through the merchant user interface of the commerce processing device, information associated with processing a payment in respect of the time-based resource and the product-based resource using a payment processing facility on a commerce processing device, wherein the payment processing facility processes payments through the commerce processing device based at least in part on an input received from the customer experience resource facility.

In an aspect, a system may include a commerce processing device for displaying a customer experience resource facility, the commerce processing device configured to store a set of instructions that, when executed, cause the commerce processing device to: accept an input of scheduling information for a time-based resource; accept an input, through a merchant user interface of the commerce processing device, of scheduling information for a product-based resource; and display, through the merchant user interface of the commerce processing device, information associated with processing a payment in respect of the time-based resource and the product-based resource using a payment processing facility on a commerce processing device, wherein the payment processing facility processes payments through the commerce processing device based at least in part on an input received from the customer experience resource facility.

In an aspect, a computer-implemented method for a merchant interface may include accepting an input, through a merchant user interface of a commerce processing device, associated with at least one scheduling workflow component on the merchant user interface, wherein a scheduling content associated with the at least one scheduling workflow component is determined at least in part from a scheduling input from a customer experience resource facility, the customer experience resource facility comprising a time-based resource scheduling function and a product-based resource scheduling function; and displaying at least one payment workflow component on the merchant user interface, wherein a payment content associated with the at least one payment workflow component is determined at least in part from a payment input from a payment processing facility, the payment processing facility comprising a time-based payment processing function and a product-based payment processing function, wherein the scheduling content is based at least in part on the payment content.

In an aspect, a system may include a commerce processing device for displaying a customer experience resource facility, the commerce processing device configured to store a set of instructions that, when executed, cause the commerce processing device to: accept an input, through a merchant user interface of the commerce processing device, associated with at least one scheduling workflow component on the merchant user interface, wherein a scheduling content associated with the at least one scheduling workflow component is determined at least in part from a scheduling input from a customer experience resource facility, the customer experience resource facility comprising a time-based resource scheduling function and a product-based resource scheduling function; and display at least one payment workflow component on the merchant user interface, wherein a payment content associated with the at least one payment workflow component is determined at least in part from a payment input from a payment processing facility, the payment processing facility comprising a time-based payment processing function and a product-based payment processing function, wherein the scheduling content is based at least in part on the payment content.

In an aspect, a computer-implemented method for a customer user interface may include displaying a scheduling input from a customer experience resource facility on a customer user interface, the customer experience resource facility comprising a time-based resource scheduling function and a product-based resource scheduling function; and accepting an input, through the customer user interface, associated with processing a payment in respect of the scheduling input, wherein the payment is processed using a payment processing facility on a commerce processing device.

In an aspect, a system may include a commerce processing device for displaying a customer experience resource facility, the commerce processing device configured to store a set of instructions that, when executed, cause the commerce processing device to: display a scheduling input from the customer experience resource facility on a customer user interface, the customer experience resource facility comprising a time-based resource scheduling function and a product-based resource scheduling function; and accept an input, through the customer user interface, associated with processing a payment in respect of the scheduling input, wherein the payment is processed using a payment processing facility on a commerce processing device.

In an aspect, a computer-implemented method for a commerce user interface may include displaying a scheduling input from a merchant customer experience resource facility on the commerce user interface, the merchant customer experience resource facility comprising a time-based resource scheduling function and a product-based resource scheduling function; displaying a payment input from a payment processing facility on the commerce user interface, the payment processing facility comprising a time-based payment processing function and a product-based payment processing function, wherein the commerce user interface displays the payment input based at least in part on the scheduling input; and accepting an input, through the commerce user interface, associated with the displayed scheduling input.

In an aspect, a system may include a commerce processing device for displaying a customer experience resource facility, the commerce processing device configured to store a set of instructions that, when executed, cause the commerce processing device to: display a scheduling input from the customer experience resource facility on a commerce user interface, the customer experience resource facility comprising a time-based resource scheduling function and a product-based resource scheduling function; display a payment input from a payment processing facility on the commerce user interface, the payment processing facility comprising a time-based payment processing function and a product-based payment processing function, wherein the commerce user interface displays the payment input based at least in part on the scheduling input; and accept an input, through the commerce user interface, associated with the displayed scheduling input.

In an aspect, a computer-implemented method may include providing a customer experience resource facility on a commerce processing device, the customer experience resource facility comprising a time-based resource scheduling function and a product-based resource scheduling function; and providing a payment processing facility on the commerce processing device, the payment processing facility comprising a time-based payment processing function and a product-based payment processing function, wherein the payment processing facility processes payments through the commerce processing device based at least in part on an input received from the customer experience resource facility.

In an aspect, a system may include a commerce processing device comprising a customer experience resource facility, the customer experience resource facility comprising a time-based resource scheduling function and a product-based resource scheduling function; a payment processing facility on the commerce processing device, the payment processing facility comprising a time-based payment processing function and a product-based payment processing function, wherein the payment processing facility processes payments through the commerce processing device based at least in part on an input received from the customer experience resource facility.

In an aspect, a computer-implemented method for a merchant interface may include displaying a customer experience resource facility on the merchant user interface, the customer experience resource facility comprising a time-based resource scheduling function and a product-based resource scheduling function; and displaying a payment processing facility on the merchant user interface, the payment processing facility comprising a time-based payment processing function and a product-based payment processing function, wherein the payment processing facility displays payments through the merchant user interface based at least in part on an input received from the customer experience resource facility.

In an aspect, a system may include a merchant user interface for displaying a customer experience resource facility, the customer experience resource facility comprising a time-based resource scheduling function and a product-based resource scheduling function, the merchant user interface configured to store a set of instructions that, when executed, cause the merchant user interface to: display a payment processing facility on the merchant user interface, the payment processing facility comprising a time-based payment processing function and a product-based payment processing function, wherein the payment processing facility displays payments through the merchant user interface based at least in part on an input received from the customer experience resource facility.

In an aspect, a computer-implemented method for a merchant interface may include displaying at least one scheduling workflow component on the merchant user interface, wherein a scheduling content associated with the at least one scheduling workflow component is determined at least in part from a scheduling input from a customer experience resource facility, the customer experience resource facility comprising a time-based resource scheduling function and a product-based resource scheduling function; and displaying at least one payment workflow component on the merchant user interface, wherein a payment content associated with the at least one payment workflow component is determined at least in part from a payment input from a payment processing facility, the payment processing facility comprising a time-based payment processing function and a product-based payment processing function, wherein the scheduling content is based at least in part on the payment content.

In an aspect, a system may include a merchant user interface for displaying a customer experience resource facility, the merchant user interface configured to store a set of instructions that, when executed, cause the merchant user interface to: display at least one scheduling workflow component on the merchant user interface, wherein a scheduling content associated with the at least one scheduling workflow component is determined at least in part from a scheduling input from a customer experience resource facility, the customer experience resource facility comprising a time-based resource scheduling function and a product-based resource scheduling function; and display at least one payment workflow component on the merchant user interface, wherein a payment content associated with the at least one payment workflow component is determined at least in part from a payment input from a payment processing facility, the payment processing facility comprising a time-based payment processing function and a product-based payment processing function, wherein the scheduling content is based at least in part on the payment content.

In an aspect, a computer-implemented method for a customer user interface may include displaying a scheduling input from a customer experience resource facility on the customer user interface, the customer experience resource facility comprising a time-based resource scheduling function and a product-based resource scheduling function; and displaying a payment input from a payment processing facility on the customer user interface, the payment processing facility comprising a time-based payment processing function and a product-based payment processing function, wherein the customer user interface displays the payment input based at least in part on the scheduling input.

In an aspect, a system may include a customer user interface for displaying a customer experience resource facility, the customer user interface configured to store a set of instructions that, when executed, cause the customer user interface to: display a scheduling input from the customer experience resource facility on the customer user interface, the customer experience resource facility comprising a time-based resource scheduling function and a product-based resource scheduling function; and display a payment input from a payment processing facility on the customer user interface, the payment processing facility comprising a time-based payment processing function and a product-based payment processing function, wherein the customer user interface displays the payment input based at least in part on the scheduling input.

In an aspect, a computer-implemented method for a commerce user interface may include displaying a scheduling input from a customer experience resource facility on the commerce user interface, the customer experience resource facility comprising a time-based resource scheduling function and a product-based resource scheduling function; displaying a payment input from a payment processing facility on the commerce user interface, the payment processing facility comprising a time-based payment processing function and a product-based payment processing function, wherein the commerce user interface displays the payment input based at least in part on the scheduling input, and displaying a graphical input display function for selecting an action based on the displayed scheduling input.

In an aspect, a system may include a commerce user interface for displaying a customer experience resource facility, the commerce user interface configured to store a set of instructions that, when executed, cause the commerce user interface to: display a scheduling input from the customer experience resource facility on the commerce user interface, the customer experience resource facility comprising a time-based resource scheduling function and a product-based resource scheduling function; display a payment input from a payment processing facility on the commerce user interface, the payment processing facility comprising a time-based payment processing function and a product-based payment processing function, wherein the commerce user interface displays the payment input based at least in part on the scheduling input, and displaying a graphical input display function for selecting an action based on the displayed scheduling input.

In an aspect, a computer-implemented method may include scheduling, on a customer experience resource facility, a time-based event, wherein the time-based event is coupled to a product-based offering; updating, on the customer experience resource facility, the time-based event based on a first commerce exchange comprising a time-based customer experience occurrence related to the scheduled time-based event; updating, on the customer experience resource facility, the time-based event based on a second commerce exchange comprising a product-based customer experience occurrence related to the product-based offering; and processing, on the payment processing facility, payments associated with the time-based customer experience occurrence and the product-based customer experience occurrence.

In an aspect, a system may include a customer experience resource facility configured to store a set of instructions that, when executed, cause the customer experience resource facility to: schedule, on the customer experience resource facility, a time-based event, wherein the time-based event is coupled to a product-based offering; update, on the customer experience resource facility, the time-based event based on a first commerce exchange comprising a time-based customer experience occurrence related to the scheduled time-based event; update, on the customer experience resource facility, the time-based event based on a second commerce exchange comprising a product-based customer experience occurrence related to the product-based offering; and process, on the payment processing facility, payments associated with the time-based customer experience occurrence and the product-based customer experience occurrence.

In an aspect, a computer-implemented method for a merchant user interface may include inputting, through a merchant user interface, a time-based event, wherein the time-based event is coupled to a product-based offering; updating, through the merchant user interface, the time-based event based on a first commerce exchange comprising a time-based customer experience occurrence related to the scheduled time-based event; updating, through the merchant user interface, the time-based event based on a second commerce exchange comprising a product-based customer experience occurrence related to the product-based offering; and processing, through the merchant user interface, payments associated with the time-based customer experience occurrence and the product-based customer experience occurrence.

In an aspect, a system may include a merchant user interface for displaying a customer experience resource facility, the merchant user interface configured to store a set of instructions that, when executed, cause the merchant user interface to: input, through the merchant user interface, a time-based event, wherein the time-based event is coupled to a product-based offering; update, through the merchant user interface, the time-based event based on a first commerce exchange comprising a time-based customer experience occurrence related to the scheduled time-based event; update, through the merchant user interface, the time-based event based on a second commerce exchange comprising a product-based customer experience occurrence related to the product-based offering; and process, through the merchant user interface, payments associated with the time-based customer experience occurrence and the product-based customer experience occurrence.

In an aspect, a computer-implemented method for a merchant interface may include inputting, through a merchant user interface, a time-based event, wherein the time-based event is coupled to a product-based offering; updating, through the merchant user interface, the time-based event based on a first commerce exchange comprising a time-based customer experience occurrence related to the scheduled time-based event; updating, through the merchant user interface, the time-based event based on a second commerce exchange comprising a product-based customer experience occurrence related to the product-based offering; and processing, through the merchant user interface, payments associated with the time-based customer experience occurrence and the product-based customer experience occurrence, and displayed through the at least one payment workflow component.

In an aspect, a system may include a merchant user interface for displaying a customer experience resource facility, the merchant user interface configured to store a set of instructions that, when executed, cause the merchant user interface to: input, through the merchant user interface, a time-based event, wherein the time-based event is coupled to a product-based offering; update, through the merchant user interface, the time-based event based on a first commerce exchange comprising a time-based customer experience occurrence related to the scheduled time-based event; update, through the merchant user interface, the time-based event based on a second commerce exchange comprising a product-based customer experience occurrence related to the product-based offering; and process, through the merchant user interface, payments associated with the time-based customer experience occurrence and the product-based customer experience occurrence, and displayed through the at least one payment workflow component.

In an aspect, a computer-implemented method for a customer user interface may include updating, through a customer user interface, the time-based event based on a first commerce exchange comprising a time-based customer experience occurrence related to the scheduled time-based event; updating, through the customer user interface, the time-based event based on a second commerce exchange comprising a product-based customer experience occurrence related to the product-based offering; and processing, through the customer user interface, payments associated with the time-based customer experience occurrence and the product-based customer experience occurrence.

In an aspect, a system may include a customer user interface for displaying a customer experience resource facility, the customer user interface configured to store a set of instructions that, when executed, cause the customer user interface to: update, through a customer user interface, the time-based event based on a first commerce exchange comprising a time-based customer experience occurrence related to the scheduled time-based event; update, through the customer user interface, the time-based event based on a second commerce exchange comprising a product-based customer experience occurrence related to the product-based offering; and process, through the customer user interface, payments associated with the time-based customer experience occurrence and the product-based customer experience occurrence.

In an aspect, a computer-implemented method for a commerce user interface may include inputting, through a customer user interface, a time-based event, wherein the time-based event is coupled to a product-based offering; updating, through the customer user interface, the time-based event based on a first commerce exchange comprising a time-based customer experience occurrence related to the scheduled time-based event; updating, through the customer user interface, the time-based event based on a second commerce exchange comprising a product-based customer experience occurrence related to the product-based offering; and processing, through the customer user interface, payments associated with the time-based customer experience occurrence and the product-based customer experience occurrence.

In an aspect, a computer-implemented method for a commerce user interface may include a customer user interface for displaying a customer experience resource facility, the customer user interface configured to store a set of instructions that, when executed, cause the customer user interface to: input, through a customer user interface, a time-based event, wherein the time-based event is coupled to a product-based offering; update, through the customer user interface, the time-based event based on a first commerce exchange comprising a time-based customer experience occurrence related to the scheduled time-based event; update, through the customer user interface, the time-based event based on a second commerce exchange comprising a product-based customer experience occurrence related to the product-based offering; and process, through the customer user interface, payments associated with the time-based customer experience occurrence and the product-based customer experience occurrence.

Certain further aspects of the present disclosure are described as follows, any one or more of which may be present in embodiments described throughout the disclosure. A product-based resource may be associated with the time-based resource. A commerce processing device may be a point-of-sale device. At least one of a personnel-based resource scheduling function and a location-based resource scheduling function may be included. An input received from the customer experience resource facility may be received by an application program interface. A time-based resource, the product-based resource, and the payment processing facility may be all coupled to a calendar event function. A calendar event function may depict the time-based resource, the product-based resource, and the payment processing facility in a calendar view presentation displayed on the commerce processing device. A calendar event function may be created on the commerce processing device. Creation of the calendar event function may trigger the creation of a workflow sequence associated with execution of the time-based resource and the product-based resource. Creation of the calendar event function may trigger the creation of a second calendar event function. A time-based customer experience occurrence may be a time-for-service commerce exchange. A time-for-service commerce exchange may occur between a merchant and a customer. A product-based customer experience occurrence may be a product exchange between a merchant and a customer.

BRIEF DESCRIPTION OF THE FIGURES

FIG. 2 depicts an embodiment of a home page of an administrator.

FIGS. 5A-C depict an embodiment calendar functional process flow.

FIGS. 6A-C depict embodiment timeline movement views of agenda states within a calendar view of daily appointments.

FIG. 6D depicts an embodiment of a blank calendar with no calendar events shown and to which calendar events may be added.

FIG. 7 depicts an authorization flow associated with connecting to a third-party calendar.

FIGS. 8A-D depict embodiment calendar event detail views.

FIGS. 9A-B depict embodiment calendar event creation views.

FIGS. 10A-D depict further embodiment calendar event creation views.

FIGS. 11A-C depict scheduling time and products together.

FIGS. 12A-12L depict views of the calendar in association with scheduling and tracking resources through appointments and checkout.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
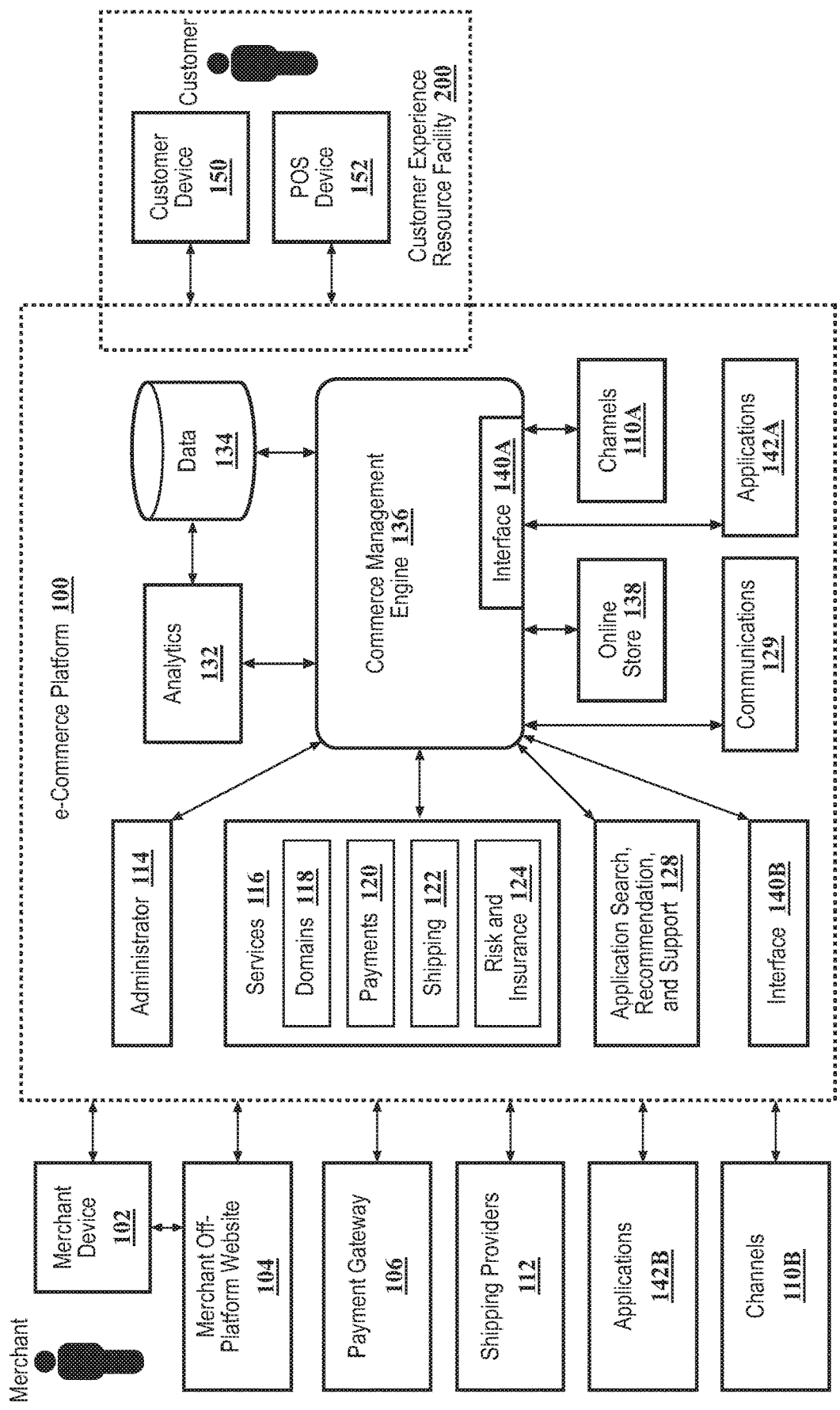
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152

(e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
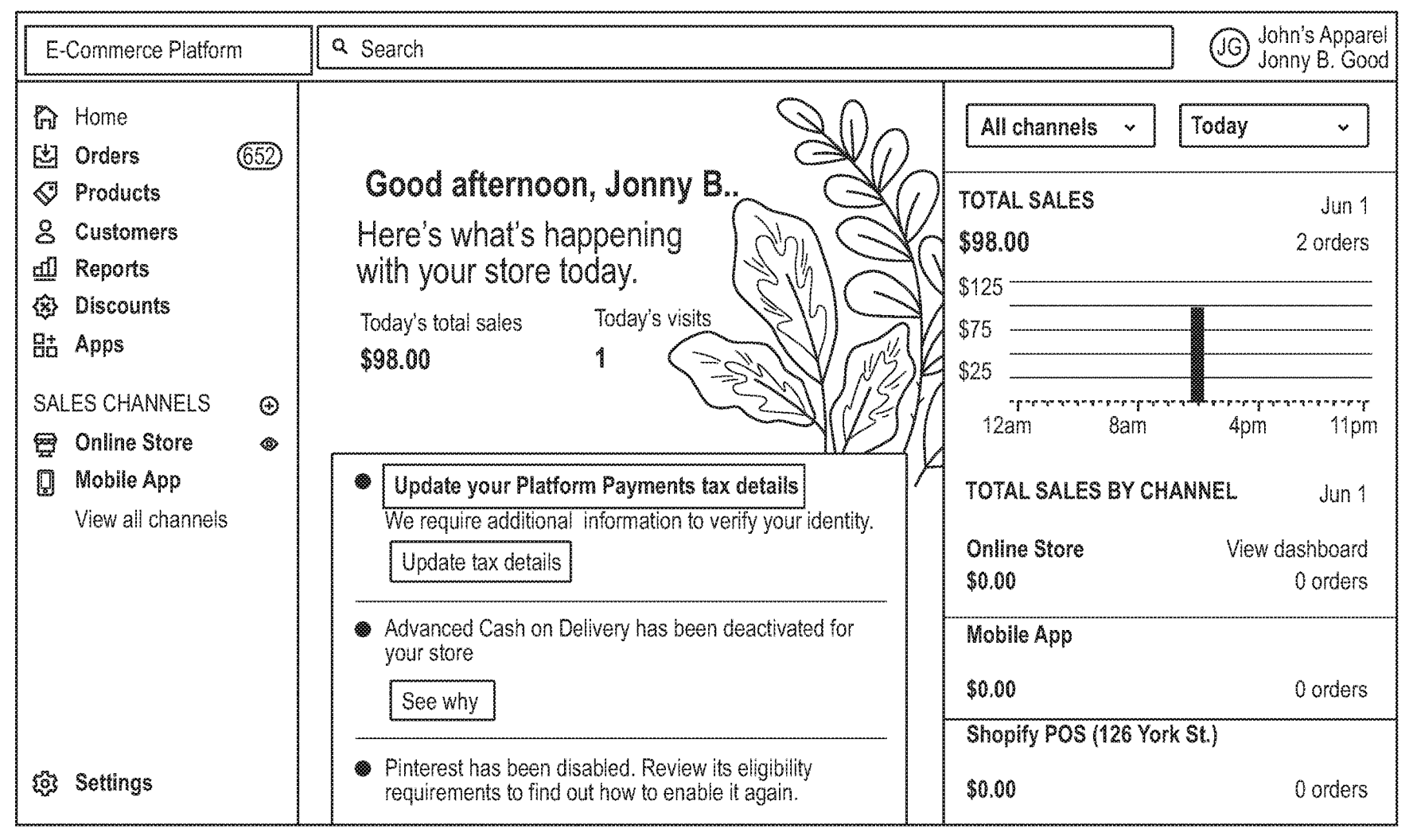

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancellation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide for a customer experience resource facility 200 for managing a customer experience, such as with a merchant, where the customer experience resource facility 200 may be part of a point-of-sale (POS) device 152, integrated through a POS device 152, integrated with a customer device, exposed through an API, and the like, such as through a user interface showing a view of calendar events. In embodiments, the customer experience resource facility 200 may be or include one or more of a software, computer code or instructions, software application, module, component, engine or the like. Managing a customer experience may include a calendar view for establishing calendar events with a time for the customer experience, a product for use or delivery during the customer experience, allocation of human resources for the customer experience, allocation of location-based resources for the customer experience, and the like. In embodiments, a calendar view may be made available on a POS device 152, through a user interface, through a merchant home page, through the administrator 114, and the like, where merchants may enable or disable the view, display a time selected view (e.g., a day view, a week view, month view, jump to a date, scroll by weeks, and the like), display events (e.g., tapping on the event shows details possibly in a read-only view), display an agenda view, and the like. The customer experience resource facility 200 may provide unified functionality support for the customer experience (e.g., through a POS device), including calendar events (e.g., event title, date, start time, duration, time zone, notes and/or the ability to initiate a cart, check-out or other workflow), product views (e.g. with a duration for a given product), time management (e.g., scheduling a day, time, and location for a customer experience, such as including scheduling for the customer, merchant personnel, product, facilities and/or other resources), location-based management (e.g., merchant location allocation and usage, renting of location-based space, allocation of shared location-based facilities, location-based preparation, location-based maintenance, and/or location-based cleaning), personnel and/or service management (scheduling of employee work schedules, scheduling personnel work-time allocation, and/or exchanging employee shifts), product management (e.g., reserving products, ordering products, product placement, product inventory control, packaging products, and/or shipping products), financial management (e.g., customer payment processing, customer payment invoicing, product payment processing, human resource financial reconciliation (e.g., employee payroll, contractor payment, and/or temporary worker payment)), and the like. In embodiments, a calendar event may include or be associated with commerce objects, such as for a product, service, scheduled event, location, personnel, resource and the like. Objects may be modified, added, or removed from the associated event. When completed, a calendar event may be converted at checkout, such as totaling costs for products and service, triggering a next scheduled event, triggering personnel actions, and the like. In embodiments, a partner or third-party and their associated applications may display events in or otherwise integrate with the calendar view.

Figure 3:
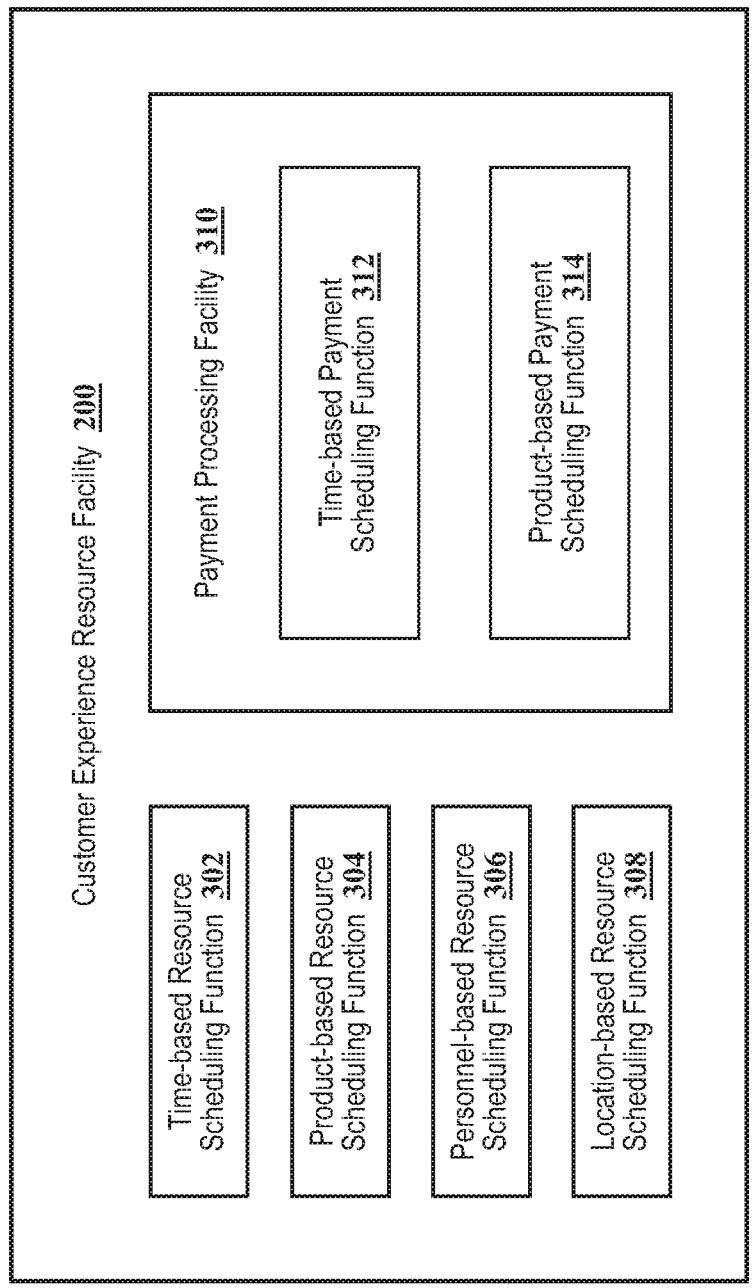
FIG. 3 depicts an embodiment of the customer experience resource facility.

Unlike disparate management applications typically available to a merchant (e.g., one for scheduling customer appointments, one for managing payment checkout, one for managing personnel resources, and the like), the customer experience resource facility 200 may provide a single integrated electronic resource for managing resource needs of a merchant. For instance, a merchant may be able to schedule an appointment with a customer in conjunction with products, personnel, and facilities required for the appointment. Referring to FIG. 3, in embodiments the customer experience resource facility 200 may provide for a time-based resource scheduling function 302, a product-based resource scheduling function 304, a personnel-based resource scheduling function 306, a location-based resource scheduling function 308, and the like, as part of an integrated platform, such as integrated in a POS device 152 with a payment processing facility 310. In embodiments, the payment processing facility 310, such as including a time-based payment processing function 312 and a product-based payment processing function 314, may processes payments through the POS device based at least in part on an input received from the customer experience resource facility. These functions may then be coupled to a calendar view of a calendar event function, such as displayed on the POS device 152. Further, the merchant may be able to expand product and service offerings through the use of the customer experience resource facility 200.

Figure 4:
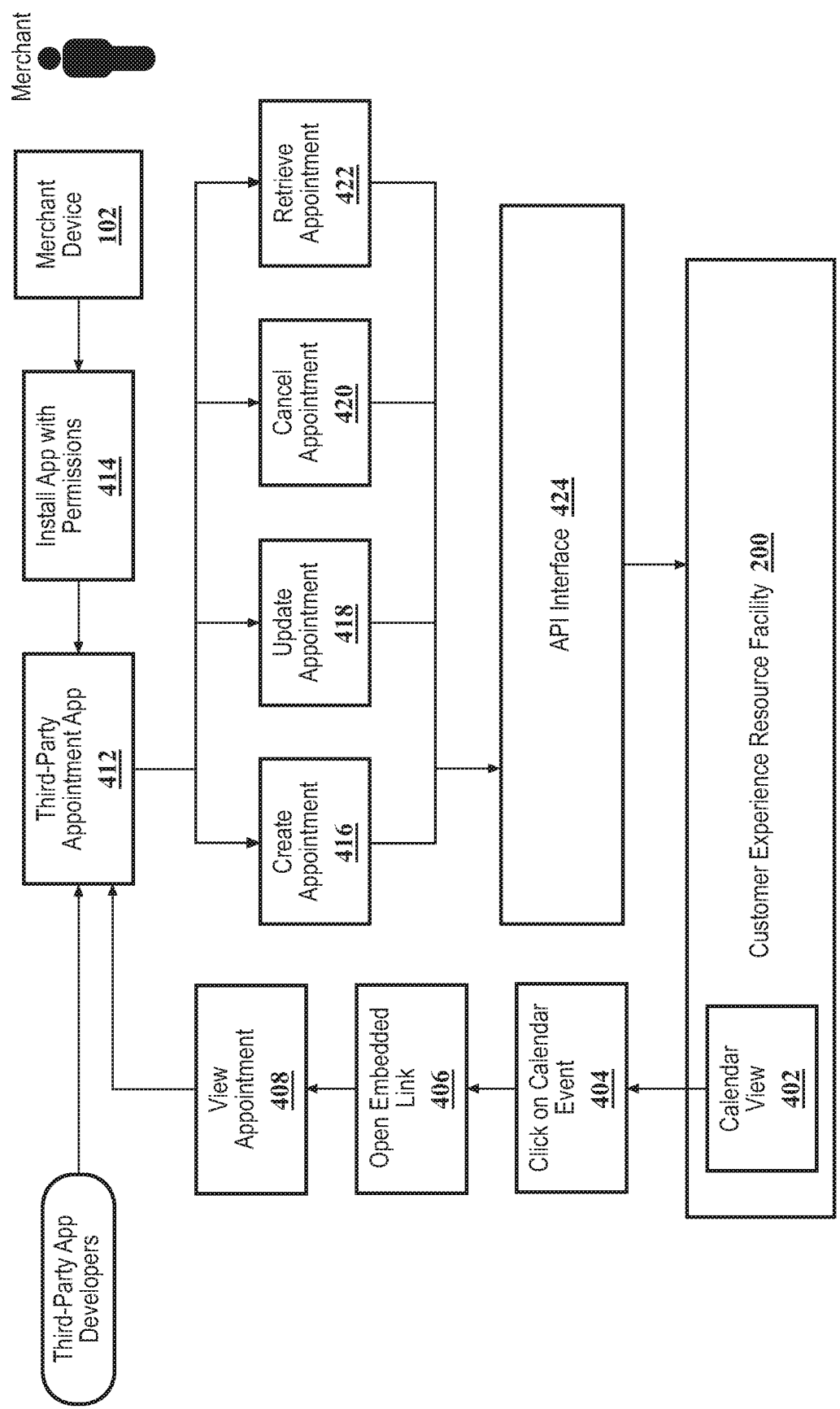
FIG. 4 depicts an embodiment API interface process flow in association with the customer experience resource facility.

In embodiments, an API may interface with the customer experience resource facility 200, such as to inject and/or expose events with a processing facility (e.g., the commerce management engine 136, applications 142, and the like). For instance, a third-party application may inject an in-store pickup calendar event for display on a calendar view which is then associated with an order, customer, and the like. In embodiments, an API may support retrieving calendar events for a POS device for a given online store or retrieving calendar events for a given online store (e.g., providing a list of events and filtered for a date range), creating, updating, or deleting a calendar event (e.g., with inputs for title, start and end date-time, description, or location), and the like. Referring to FIG. 4, in embodiments a merchant may install or enable the functionality of a third-party appointment application 412 through an online store 138 or merchant device 102, such as where the merchant assigns permissions associated with access to the third-party appointment application 412 through a calendar view 402 of the customer experience resource facility 200. Functional coupling of the calendar view 402 may be, for instance, linked to the third-party appointment application 412, such as to the customer experience resource facility 200 through an API interface 424. In an example, a user may click on a calendar event 404 as displayed through the calendar view 402, such as where the calendar event 404 includes an embedded link. Opening the embedded link 406, the user may view an appointment 408, which is then opened in the third-party appointment application 412. The user may then perform functions associated with the third-party appointment application 412, such as to create, update, cancel, retrieve, and the like, a calendar event, where these functions are then coupled back to the customer experience resource facility 200 through the API interface 424. In embodiments, embedded links may be used to embed other third-party actions, such as in-store pickup actions, shipping actions, payment actions, service actions, and the like through third-party applications. For instance, a customer may be browsing a store with a third-party in-store pickup application (e.g., such as permissioned by the merchant) where the customer adds products to a cart and selects in-store pickup (or delivery to a store location) with a date and time. Upon completion of the checkout process the third-party application may post pickup details to a calendar view, such as through the API interface 424. An embedded link may then be set in a calendar event for the in-store pickup, such as by the third-party application provider. The merchant may then bring up a calendar view, click on the order event, and open the third-party application, which may then trigger a workflow for the pickup.

In embodiments, a calendar or calendar event may store a data model for use in the control of creating, viewing, editing, or administering the calendar event. For instance, the data model may include a calendar event identifier (e.g., unique for each calendar event), title (e.g., text that will be shown in a calendar view), description (e.g., detailed text that will be displayed when the calendar event is selected), online store identifier (e.g., for the online store that the calendar event belongs to), location identifier (e.g., for the location of the calendar event), API permission identifier (e.g., associated with the assignment of permissions for the calendar event), start (e.g., the start date and time for the calendar event), end (e.g., the end date and time for the calendar event), bookable identifier (e.g., an identifier for an object associated with the calendar event, such as a product or line item of the calendar event), bookable type (e.g., the type of the object being booked), creation (e.g., the date and the time the calendar event was created), update (e.g., the date and the time the calendar event was updated), hidden attribute (e.g., an attribute that determines whether the calendar event is hidden or not, such as hidden based on a permission to view, public vs. private view, merchant vs. salesforce), and the like. In embodiments, some of the data model information may be used for associating the calendar event with an online store and others for detailing information within the calendar event itself (e.g., title and description). In embodiments, a bookable item associated with a calendar event may be any assigned aspect of the calendar event, such as a product or SKU of the product, list of products, sequence of sub-events or line item within the calendar event (e.g., setting up a venue for a customer), third-party activity (e.g., a third-party application setting up an in-store pickup at a retail location), and the like.

In embodiments, permissions may be associated with a calendar event, such as assigned to the entire calendar event, an aspect of the calendar event (e.g., to product listings, personnel involved, or locations assigned), a calendar, multiple calendars, and the like. Permissions may be assigned to individuals (e.g. a customer), groups of individuals (e.g., sales people), company entities (e.g., a department associated with an online store), to all (e.g., made public), and the like. Permissions may limit access, such as providing read-only access, read-write access, editing control, cost view access, approval access, and the like. For instance, a merchant may create a calendar event and assign products, personnel, and facilities for executing the calendar event for a customer. The merchant, as the administrator of the calendar may have a default permission for all access to the calendar event, and may also have a profile of default permission levels for other individuals (e.g., access to the title and date to all (public view), access to view all in a read-only view by all employees, access to inject new calendar event aspects to a particular third-party (e.g., a shipping provider), and the like). The merchant may be able to assign and alter permissions to individuals and/or entities. In an instance where a calendar event is created by an individual other than the merchant or administrator, such as a salesperson working for an online store, the new calendar event may initially enter a sandbox state for approval before being fully accessible to those with permission to view, such as where the new calendar event is viewable to a group of individuals who have permission to view the sandboxed calendar events, permission to approve the sandboxed calendar event, and the like. In embodiments, sandboxed calendar events may appear in a marked state until approved. In another instance where a calendar event or aspect of the calendar event may be sandboxed is when a third-party injects an element into the calendar event. For instance, a third-party may assign shipping information or in-store pickup information into the calendar event, where that information is initially sandboxed before being accepted by a permissioned individual.

In embodiments, permissions may be part of a security and privacy facility within the customer experience resource facility 200, such as where a permissions profile is configured to guard against security intrusions and to provide privacy to the merchant and customers. For instance, application developers, third-party providers, and the like, may only have permission for calendar events they are associated with; sales people at the POS device may only have full permission for items in checkout, but have restricted access to other calendar events in the event workflow, and the like. In another aspect, calendar events may contain personal information for customers, and the merchant may have control over when calendar events are deleted, such as to also delete associated customer data (e.g., when a customer makes a personal information deletion request, when an application associated with the customer experience resource facility 200 is uninstalled, and the like).

In embodiments, the customer experience resource facility 200 may enable the aggregation of calendar events based on a calendar time sequence. For instance, a third-party calendar containing only brief entry descriptions and times and dates could be imported into an event calendar of the customer experience resource facility 200, where the third-party calendar entries may be converted to calendar events that then accommodate the addition of information associated with all the model data for a calendar event. This could be useful for a merchant just starting to use the customer experience resource facility 200, or for a time where the merchant is away from the customer experience resource facility 200 for a period of time when the merchant is entering information into a third-party calendar for later integration with the calendar of the customer experience resource facility 200.

In embodiments, calendar events may be searched and filtered, such as by date, time, location, use-case, permissions, personnel, products, event type, third-party association, inventory, personal actions, and the like. For instance, an employee working on in-store pickups could sort the calendar for tasks associated with the collection of products for in-store pickup, such as filtering the calendar events by time to enable the employee to work through the tasks in a time prioritized manner. In another instance, a merchant may sort by personnel to generate a work schedule for the day or week. In another instance, a third-party shipping provider may sort by product and shipping date to generate a shipping plan.

In embodiments, creating a calendar event with the customer experience resource facility 200 may trigger a workflow that couples the calendar event with other calendar events and newly spawned calendar events. For instance, the creation of a hair salon appointment may trigger a workflow that contains a workflow sequence or multiple work flow sequences associated with the appointment, including appointment time preparation, personnel involvement, facility assignments, product selection, inventory orders, and the like. In embodiments, workflows may include sequence steps with states that are indicative of a status, such as when a workflow step is open (e.g., a calendar event has been created for an item to be picked up, for a customer to try on clothing, or for a test drive of a car), pending (e.g., an item is ready for pickup, a room is set up and ready for a customer to try on clothing, or a car is ready for a test drive), active (the item is being brought out the customer's car, the customer is in the dressing room trying on the clothing, or the car is out for the test drive), compete or success (e.g., the item has been picked up, the customer is done trying on the clothing and has left the room, or the test drive is complete and the car needs to be returned to the lot), and other like status states, such as check-in, check-out, paid, ordered, received, the like. In embodiments, a calendar event may have status states associated with a calendar event being a recurring event, such as current, pending, active, or complete, such as in association with data for recurrence (e.g., whether the event is recurring, a recurring end date, a recurrence frequency, an original event identifier for the first event from which the recurrence was first generated, and the like). In embodiments, a recurring event may generate multiple event workflows, multiple calendar event views, and the like. In embodiments, creating the calendar event may include multiple line items (e.g., products, an appointment, or a service), such as where each line item may have a detail (e.g., listing of products or who and where the appointment or service is to take place). Creating a calendar event may trigger multiple workflows, such as where each workflow deals with different aspects of the calendar event. For instance, in a calendar event where a customer is going to select clothing to try on in a retail space, there may be one workflow for personnel or a software agent to assist the customer in the selection of clothing, a second workflow for personnel to collect the clothing to be brought to the fitting room, a third workflow for personnel to prepare and clean out the fitting room, a fourth workflow to assist the customer during fitting and bring selected items to checkout, and the like, where each workflow may show status states. As such, a single calendar event may provide for multiple fulfillment workflows associated with a single commerce activity.

In embodiments, a calendar event may include a third-party action, such as for a shipping provider, a service provider, a payment provider, and the like. A third-party action may be accessed through a link provided in the calendar event that brings the merchant to a third-party site where the action can be tracked, incorporated directly into the calendar event where the third-party has permissions to update workflow actions, and the like. For instance, an in-store pickup provider action may be integrated into a checkout workflow, where a link is embedded at the POS device checkout process that shows all the pickup appointments in an embedded view on the POS device. In another instance, a person may be booked to provide a service to a customer, such as for providing classes, tours, product demonstrations, installations, and the like, where the service action and status may be tracked through a link or by the service provider through permissions. In embodiments, external applications may create, update, fetch data, and delete calendar events if they have permissions to do so. External applications may be able to push events into the customer experience resource facility 200, such as a new event, as a new action within an existing event (e.g., which could then trigger a workflow within the event), as a recurring event, as a modification to an existing event, and the like.

In embodiments, a computer-implemented method or system may include using the customer experience resource facility 200 on a commerce processing device (e.g., a POS device) to schedule a time-based resource (e.g., an appointment-based event), such as associated with a product-based resource, and processing a payment in respect of the time-based resource and the product-based resource using a payment processing facility on the commerce processing device. The payment processing facility may process payments through the commerce processing device, such as based on an input received from the customer experience resource facility.

In embodiments, a computer-implemented method or system may include using the customer experience resource facility 200 to schedule a time-based event (e.g., an appointment-based event), where the time-based event is coupled to a product-based offering, such as where the time-based event is updated based on a first commerce exchange comprising a time-based customer experience occurrence (e.g., a customer has completed a hair treatment in a salon, and the appointment-based event is updated to show completion) related to the scheduled time-based event; the time-based event is updated based on a second commerce exchange including a product-based customer experience occurrence related to the product-based offering (e.g., the customer used a product during the hair treatment); and processing, on the payment processing facility, payments associated with the time-based customer experience occurrence and the product-based customer experience occurrence.

In embodiments, a computer-implemented method or system may include using the customer experience resource facility 200 on a commerce processing device, such as where the customer experience resource facility includes a time-based resource scheduling function (e.g., inputting time related event aspects) and a product-based resource scheduling function (e.g., inputting product related event aspects, such as using a product during an appointment); and providing a payment processing facility on the commerce processing device. The payment processing facility may include a time-based payment processing function (e.g., paying for an appointment) and a product-based payment processing function (e.g., paying for a product related to the appointment), where the payment processing facility may process payments through the commerce processing device, such as based on an input received from the customer experience resource facility 200.

In embodiments, the customer experience resource facility 200 may be accessed through one or more user interfaces associated with the unified functionality, such as a POS device user interface (e.g., with multiple dimensions of the customer experience integrated with payment processing in a POS device), merchant-facing user interface (e.g., for managing the provider side of a customer experience), a customer-facing user interface (e.g., to provide customer access to a customer experience), a personnel-facing user interface (e.g., for entering interaction information between merchant personnel and a user experience), a vendor-facing user interface (e.g., for providing a third-party resource interface), and the like. In embodiments, the one or more user interfaces may display functions associated with the time-based resource scheduling function 302, the product-based resource scheduling function 304, the personnel-based resource scheduling function 306, the location-based resource scheduling function 308, the payment processing facility 310, the time-based payment processing function 312, the product-based payment processing function 314, and the like. These functions may then be displayed in association with a calendar view of a calendar event function, such as displayed on the POS device 152. In embodiments, user interfaces with the customer experience resource facility 200 may be provided through a POS device 152, a merchant device 102, a customer device 150, an online store 138, an interface to the administrator 114, an interface to a channel 110A-B, a third-party commerce or provider interface, and the like.

In an example, a hair salon may offer hair treatment services that involve scheduling a time for the treatment, scheduling personnel for applying the treatment, preparing a treatment room (e.g., cleaning, lighting, entertainment, music, and the like), preparing consumable resources (e.g., hair product, skin lotion, and the like) and non-consumable resources (e.g., towels, applicators, and the like), allocating and placing the necessary treatment products in the treatment room for use during the treatment, processing a payment for the treatment, processing a payment for product used, packaging up purchased but not consumed consumables for the customer, cleaning the treatment room, scheduling a next appointment, providing after-treatment support services, and the like. Through the customer experience resource facility 200, a merchant may be able to manage multiple actions through an integrated user interface and workflow process. For instance, the customer may call in for an appointment, and through the customer experience resource facility 200 the merchant may select a day and time, select personnel for the treatment, allocate a room for the treatment, allocate and/or order products for the treatment, assign personnel for prep and cleanup of the room with respect to the treatment, track and process payment for the treatment, and query for a next appointment, additional products for sale, products for the next appointment, post-sale support, and the like, where some of these steps are performed by the customer experience resource facility 200 without intervention by the merchant.

In embodiments, some user experience functions may be executed automatically (e.g., completed, populated, directed, and the like) by the customer experience resource facility 200 rather than through a merchant input or other action, such as once the appointment has been scheduled, the customer experience resource facility 200 may suggest and/or track allocation of the treatment to a treatment room, personnel associated with the treatment, products for use in the treatment, upsell products for consideration during the treatment, product placement at the checkout counter and/or in the treatment room based on the treatment, and the like, such as based on a merchant input, customer profile, customer preferences, past behavior of the specific customer or as determined through customer analytics, customer feedback, merchant preferences, personnel availability, product availability, new product offerings, and the like.

Further, in embodiments the customer experience resource facility 200 may enable a merchant to expand sale of products and services beyond traditional boundaries associated with merchant support applications. Continuing with the example of the hair salon, a customer may make a request for a pre-wedding salon treatment for a wedding party at an outside venue, where the customer experience resource facility 200 may allocate resources as before but now providing additional staging process steps associated with performing the treatment(s) in the outside venue, such as packaging products and treatment materials for transport to the outside venue, arranging for transportation to and from the venue for merchant personnel and customers, initiating communications with the agency (public or private) of the outside venue for permission and scheduling, arrangement for music, and like. Through the customer experience resource facility 200, a merchant may be able to manage functions in an integrated process flow.

In embodiments, the customer experience resource facility 200 may provide for a POS device user interface, such as with multiple dimensions of the customer experience integrated with payment processing in a POS device 152. For instance, a typical POS device may be restricted to payment processing, such as at checkout, where the costs of products and services selected by a customer are totaled and presented to the client in a request for payment. However, a POS user interface of the customer experience resource facility 200 may provide an integrated presentation for the functionality provided through the customer experience resource facility 200. For instance, personnel attending the POS device 152 of a physical store may be able to access multiple customer experience functions through the customer experience resource facility 200 in an integrated process that increases efficiency for the multiple dimensions of customer experience that are integrally associated with the purchase of resources by the customer. In an example, and referring again to the hair salon embodiment described herein, personnel checking out a customer may have access to all the resources that were used or utilized as part of the customer experience (e.g., products, rooms, personnel, and the like), resources that the customer may want to purchase at the point of sale (e.g., products to take home, and the like), that contribute to checkout payment processing, as well as to scheduling resources in the future (e.g., appointments, services, consultations, product deliveries, and the like), profile notes for the customer (e.g., preferred products, scheduling times, personnel, reading materials, entertainment sources, refreshments, and the like), or any other merchant or other resource associated with providing a customer experience. The POS user interface of the customer experience resource facility 200 may provide an integrated view of these various dimensions of the customer experience.

In embodiments, the customer experience resource facility 200 may provide for a merchant user interface with a graphical user interface showing a workflow associated with the various dimensions of the customer experience for a customer. For instance, the workflow may be a passive representation of the workflow (e.g., for illustration purposes only) or an active workflow, where components of the workflow provide further detail and information associated with the workflow component, and where the merchant may add, revise, or manipulate the workflow. In embodiments, the customer experience resource facility 200 may generate a template workflow from a new customer experience entry, where the merchant may then modify (add, alter, or delete) workflow components as desired. In embodiments, a workflow generated for a new customer experience may be integrated into a merchant workflow for products and services currently active with the merchant, where workflow details may be available at different levels, such as one level for all currently active customer experiences, a more detailed level for focusing on a specific customer experience, a still more detailed level for focusing on a specific process step within a customer experience (e.g., the treatment room, with personnel assigned and products deployed).

In embodiments, a computer-implemented method or system for a merchant interface may include accepting an input through a merchant user interface of a commerce processing device displaying a customer experience resource facility, such as where scheduling information for a time-based resource may be input, accepting the input of scheduling information for a product-based resource, and displaying information associated with processing a payment in respect of the time-based resource and the product-based resource using a payment processing facility on a commerce processing device. The payment processing facility may process payments through the commerce processing device based at least in part on an input received from the customer experience resource facility.

In embodiments, a computer-implemented method or system for a merchant interface may include accepting an input, such as associated with a scheduling workflow component on the merchant user interface, where a scheduling content associated with the scheduling workflow component may be determined from a scheduling input from a customer experience resource facility. The customer experience resource facility may include a time-based resource scheduling function and a product-based resource scheduling function. A payment workflow component may be displayed on the merchant user interface, where a payment content associated with the payment workflow component may be determined from a payment input from a payment processing facility. The payment processing facility may include a time-based payment processing function (e.g., processing an appointment-based aspect) and a product-based payment processing function (e.g., processing a product-based aspect), where the scheduling content may be based on the payment content (e.g., where the scheduling content and the payment content are coupled together as part of a unified process).

In embodiments, the customer experience resource facility 200 may provide for a user interface for a customer to interact with respect to a customer experience, such as for initiating a customer experience scheduling, specifying products and services, adjusting conditions or products associated with a pending customer experience, providing feedback from a received customer experience, providing payment information for a customer experience, search for customer experiences, receive recommendations for customer experiences, and the like. In embodiments, the customer experience resource facility 200 may provide communications between the customer and the merchant, where the merchant is provided an opportunity for acquiring new business through the interaction, feedback from a customer, interactions with a customer during an active customer experience, service interactions with a customer after a customer experience, and the like.

In embodiments, a computer-implemented method or system for a customer user interface may include displaying a scheduling input from a customer experience resource facility 200 on a customer user interface, the customer experience resource facility includes a time-based resource scheduling function and a product-based resource scheduling function, and where an input is accepted through the customer user interface, such as associated with processing a payment in respect of the scheduling input, where the payment is processed using a payment processing facility on a commerce processing device.

In embodiments, a computer-implemented method or system for a commerce user interface may include displaying a scheduling input from a merchant customer experience resource facility on the commerce user interface, where the merchant customer experience resource facility includes a time-based resource scheduling function and a product-based resource scheduling function. A payment input may be displayed from a payment processing facility on the commerce user interface, where the payment processing facility may include a time-based payment processing function and a product-based payment processing function. The commerce user interface may display the payment input based on the scheduling input for accepting an input, such as associated with the displayed scheduling input.

In embodiments, the customer experience resource facility 200 may provide for a user interface for a third-party provider, such as interfacing with the customer experience resource facility 200 as a result of a merchant request with respect to a customer experience. For instance, referring to the hair salon example providing a treatment in an outside venue, a live music group scheduled to perform at the outside venue at the time of the treatment may be running late, and communicate such through the third-party interface. As a result, the customer experience resource facility 200 may provide notifications to the merchant, possibly including work-a-round suggestions (e.g., deployment of a sound system from a local provider), financial payment adjustments for a change to the service, options to the customer (e.g., to select a refund or preference with respect to live music vs. a sound system, such as presented to the customer through a notification on a customer user interface or through a communications channel (e.g., texting, phone, email), and the like. In embodiments, alternative options may be presented through a modified workflow presented through the merchant's user interface, such as presented through the merchant's POS device on-site at the outside venue (e.g., through the merchant's mobile device), enabling the merchant to make accommodations for the late arriving musicians.

In embodiments, a computer-implemented method or system for a commerce user interface (e.g., a third-party interface) may include displaying a scheduling input from a customer experience resource facility 200 on the commerce user interface, the customer experience resource facility 200 including a time-based resource scheduling function and a product-based resource scheduling function, and displaying a payment input from a merchant payment processing facility on the commerce user interface, where the payment processing facility may include a time-based payment processing function and a product-based payment processing function. The commerce user interface may display the payment input based on the scheduling input (e.g., schedule changes which may affect payment condition) and display a graphical input display function for selecting an action, such as based on the displayed scheduling input (e.g., accept or reject the current payment arrangement based on the change in the schedule).

The customer experience resource facility 200 may allow merchants to sell a variety of products through a single interface, such as physical items (e.g., selling a product and shipping it to a customer), service (e.g., selling a service and performing that service), time (e.g., an expert selling their time to instruct or guide), human resources (e.g., providing personnel), physical resources (e.g., scheduling a fitting room or test of a product), intangible resources (e.g., arranging for loan), and the like, all of which may be considered 'products' and which may be managed through the e-commerce platform. The customer experience resource facility 200 may provide a user interface platform that is flexible and scalable in both product type (e.g., the customer experience resource facility 200 is product agnostic) and product offering extent (e.g., scalable from large merchants with e-commerce and brick-and-mortar presence, to small gig-economy individuals). For instance, a large merchant with physical locations and personnel may utilize the customer experience resource facility 200 to manage the scheduling of customer interactions, product management, payment processing, personnel management, inventory control, product pick-up and the like, all through an integrated user interface, and the single-individual selling, such as selling a professional service, may use the same user interface to manage their small business.

In an example, an individual may be starting a part-time personal training business, where the individual-merchant uses the customer experience resource facility 200 to manage the sale of personal training time to customers. Through the merchant interface, the merchant may manage a calendar of appointments, such as with times and locations for personal training sessions. Customers may use a customer interface to request changes to appointments, communicate with the merchant, request new appointments, and the like. The merchant may expand their business to include the selling of support services for when the customer is working out on their own, where the customer experience resource facility 200 tracks the support service time and offers plans when a customer begins to show a consistent use of the support services. Since the customer experience resource facility 200 is capable of supporting the sale of physical items and shipment, the merchant may expand to selling physical products that support physical training, and have those items shipped directly to customers. Through the customer experience resource facility 200 a personal trainer may be able to manage multiple dimensions associated with a customer, such as scheduling a time and location for a training session, purchasing equipment and having it available for the training session (e.g., at the location of the training session), and the like, where the personal trainer is able to track and manage payment processing for all aspects of the user experience (e.g., directly through a merchant device 102, invoicing through the e-commerce platform 100, and the like). The merchant may continue to grow and open an online store 138 to provide service and product offerings, and the like. The scalability of the customer experience resource facility 200 permits growth of a merchant's business without the need to change or add new merchant support applications.

In an example, a merchant may own a clothing retail store, where traditionally a customer comes into the store, shops, brings selected items to a fitting room, and potentially purchases items through a POS device at the front of the store. Through the customer experience resource facility 200, a customer may use the customer interface to shop the store's inventory on-line before coming to the store, and then schedule an appointment to try on the cloths. Once the appointment is made, the customer experience resource facility 200 may be utilized to manually assign resources to support the appointment, automatically assign resources to support the appointment, or a combination of the two, such as to reserve a particular fitting room for a date and time duration, assign personnel to clean the fitting room, assign personnel to stock the fitting room with the items to be tried on, assign personnel to clean the room and re-stock items left behind after the appointment, personnel to greet the customer when they arrive at the store, and the like. After the appointment, the customer may select items for purchase through the store POS device 152. Alternately, the customer may select and purchase the items through the customer interface, where the customer experience resource facility 200 processes the purchase, and the customer is able to leave the store without needing to process the purchase through the store POS device. Further, the customer experience resource facility 200 may have stored customer payment information, where the customer can simply take the items they want to buy and walk out of the store without any further interfacing with either their customer device 150 or the store POS device 152, where the customer experience resource facility 200 tracks what items are taken out of the store (e.g., through RFID tags on the items or by video or images), and automatically processes them for purchase. The customer experience resource facility 200 may also track what items are purchased and not purchased with respect to inventory control, buying decisions, purchasing analytics, marketing, purchase history of the customer, recommendations for future items to the customer, sales of products to other costumers, and the like.

In an alternate example, the merchant may sell a service where a customer may order items on-line or have an expert pick out a selection of items (e.g., based on a customer profile), and schedule an appointment to pick the items up at the store to try on at home. Once the appointment is made, the customer experience resource facility 200 may be utilized to manually or automatically assign resources to support the appointment, such as personnel for collecting and packaging the selected items for pickup, personnel to bring the items out to the customer when they arrive, and the like. The 'pick-up' appointment may for a specific time, a range of time, a not-before a specified time, and the like. In embodiments, the customer may enable location services on their mobile device such that the customer experience resource facility 200 detects when the customer is proximate the store and deploys personnel to bring the items out to the customer as they arrive (e.g., walking into the store, driving up to the store, and the like).

In an alternate example, a merchant may be a tailor, where a customer is measured for a garment or where measurements are input through a user interface, and where the garment is then created and shipped or picked up by the customer. In this instance, a calendar event may be created where all the aspects of the purchase are accommodated, such as a facility location, time, and personnel for measurements; assigning materials for making the measurements; selection of garment materials; cost of creating the final product; measurement details for the customer; fitting room location, time, and personnel for the customer to try on the garment, shipping details, and the like, where the calendar event may be converted to an invoice or payment view on a POS device when the calendar event is complete. When the calendar event is converted, subsequent calendar events may be triggered, such as for periodic reminders for additional purchases, training in care and service of the garment, cleaning services, and the like, where some or all of the triggered events may then be generated as new calendar events.

In another alternate example, a customer may order a product online that is large or bulky or in some way difficult to carry (such as for the particular customer, for example if elderly or injured) and want assistance loading the product in their vehicle when they come to pick up the product. The customer experience resource facility 200 may be utilized to arrange the handling of the product, such as assigning personnel to carry the product from the isle to the front of the store before the customer arrives, assigning personnel to carry the product to the customer's vehicle, notifying personnel through a merchant or personnel-facing user interface of an assignment to the task (e.g., including name of the customer, the product, the location of the product, time of pickup, make and model of car, license plate details, contact information for the customer (e.g., text or phone), and the like), where assignments and/or notifications may be executed either manually by another merchant personnel or automatically through the customer experience resource facility 200 (e.g., through preferences set by the merchant).

In an example, a merchant may sell vehicles (e.g., cars, trucks, bicycles, motorcycles, scooters, and the like) and offer a test ride as part of the sales process. The merchant may utilize the customer experience resource facility 200 to schedule resources to support the test ride, such as a date, time, and location for the test ride, personnel to prepare the vehicle, materials used to prepare the vehicle, personnel to bring the vehicle to the customer and instruct the customer on the vehicle's use and operation, personnel and materials to clean the vehicle after the test ride, and the like. For instance, a customer may schedule a test drive of a car, and the merchant prepares the car and has it delivered to the customer for the test drive, such as while personnel are present or over a period of time at a customer specified location. Feedback may be collected and input to the customer experience resource facility 200 with respect to customer behavior, number of test drives, models driven, past purchases, and the like. In another instance, a customer may schedule a test ride for a performance bicycle, where the merchant manages the appointment through the customer experience resource facility 200, such as including assigning personnel for preparation, delivery, and operational instruction of the bike to the customer at the appointed date, time, and location, with personnel to re-stock the bike if not purchased, recording feedback from the customer related to the test ride, and the like. Additionally, the customer experience resource facility 200 may be utilized to offer materials to a customer, such as riding equipment for the bicycle (e.g., helmet, riding gloves, riding shoes, repair tools, and the like). In embodiments, the customer experience resource facility 200 may be utilized to manage multiple dimensions of the customer experience, such as arranging a test ride for a particular vehicle (e.g., motorbike) at a particular time and location (e.g., at a track), with particular products (type of fuel additive the customer is testing and a helmet the customer purchases), all managed through a POS device 152 (e.g., a mobile POS device brought to the track by the merchant), including tracking and processing payment. The merchant, upon making a sale of the vehicle, may schedule post-sale product sales, consultation, on-going support, maintenance, training, and the like, with appointment times and associated products and services tracked and invoiced through the customer experience resource facility 200.

In an example, a merchant may offer installation for a purchase product, where the merchant schedules resources required through the customer experience resource facility 200, such as a date, time, and location for the installation, personnel for the installation, personnel to collect the equipment for the installation, personnel to prepare the location for installation, personnel to clean the location after installation, services to repair location features after the installation, and the like. The customer may utilize a customer interface for requesting changes to the installation appointment, asking questions concerning the installation, communicating issues during or after the installation, and the like. Further, the customer may schedule a training session for use and care of the installed product, where the customer experience resource facility 200 is utilized to assign personnel for the training the use of the product, shipping the customer supplemental training materials, invoicing the client for training services, and the like. The customer experience resource facility 200 may be utilized to schedule service to the product, such as a repeating or non-repeating schedule for the service, products required for the service, personnel for providing the service, invoicing the service (if not included at the time of purchase), and the like. In embodiments, a third-party may be required for preparing the location, installing the product, cleaning or repairing the location after installation, providing training on the use of the product, providing servicing of the product, and the like. The third-party may utilize a third-party user interface to interface with the merchant through the customer experience resource facility 200, such as providing the third-party with a schedule of actions, products required, and the like, and providing notifications and reminders to the third-party (and the customer) related to an upcoming action.

In another example, a merchant may utilize the customer experience resource facility 200 to manage a customer experience associated with the purchase, use, and servicing of a product, such as a set of meat carving knives (e.g., a special set of knives for an annual holiday), such as where the customer experience resource facility 200 is utilized for the customer purchasing the knives (e.g., online or in a physical merchant store), scheduling a demonstration or training on the use, care, and sharping of the knives (e.g., including time and location), arranging for purchase of knife sharping materials for the demonstration, scheduling an annual sharpening of the knives (e.g., before the annual holiday), processing payment, and the like, such as managed through a POS device 152.

FIGS. 5-12L present non-limiting example embodiments for user interface views and process flows for the customer experience resource facility 200.

Figure 5A:
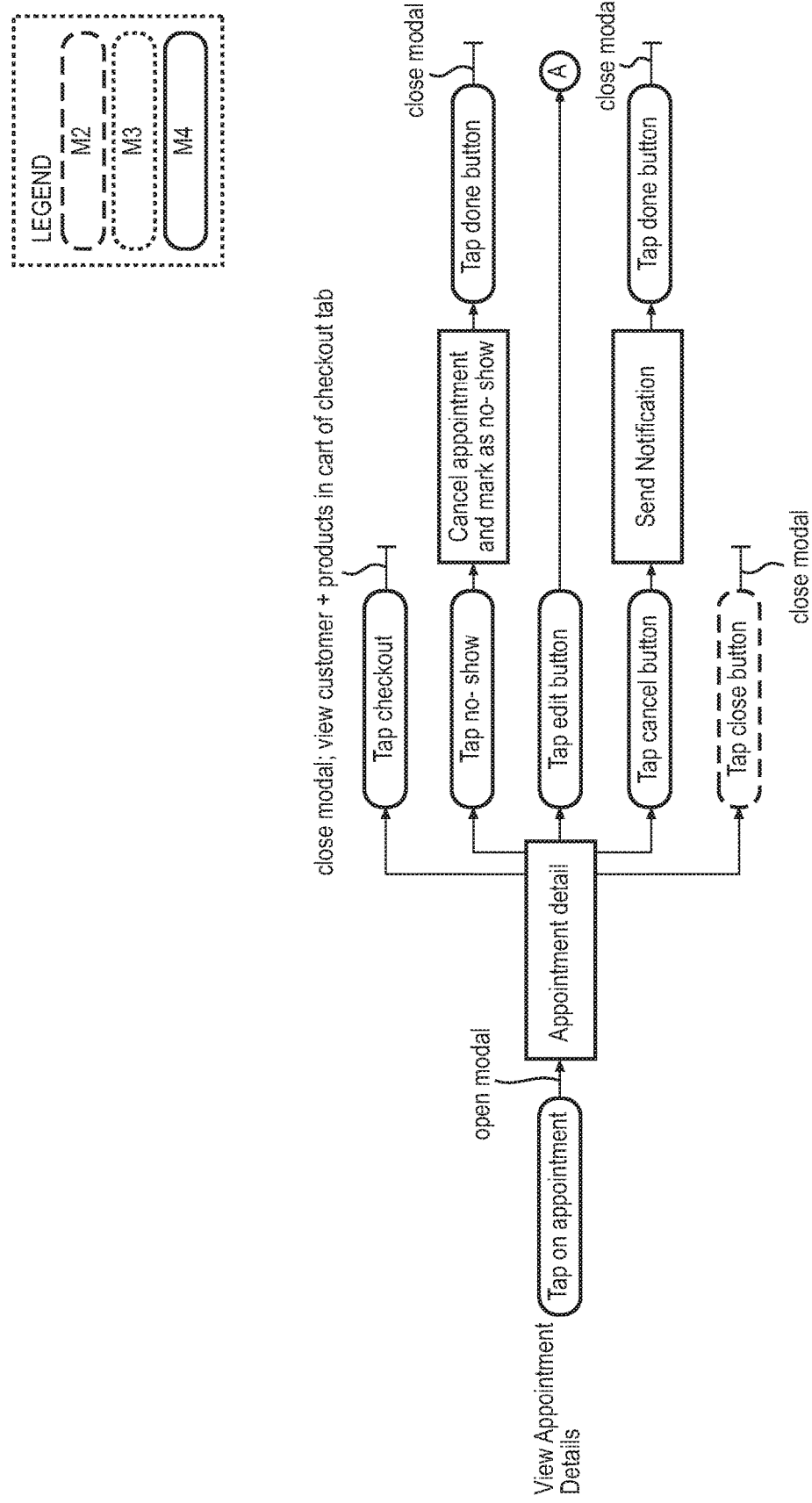
Figure 5B:
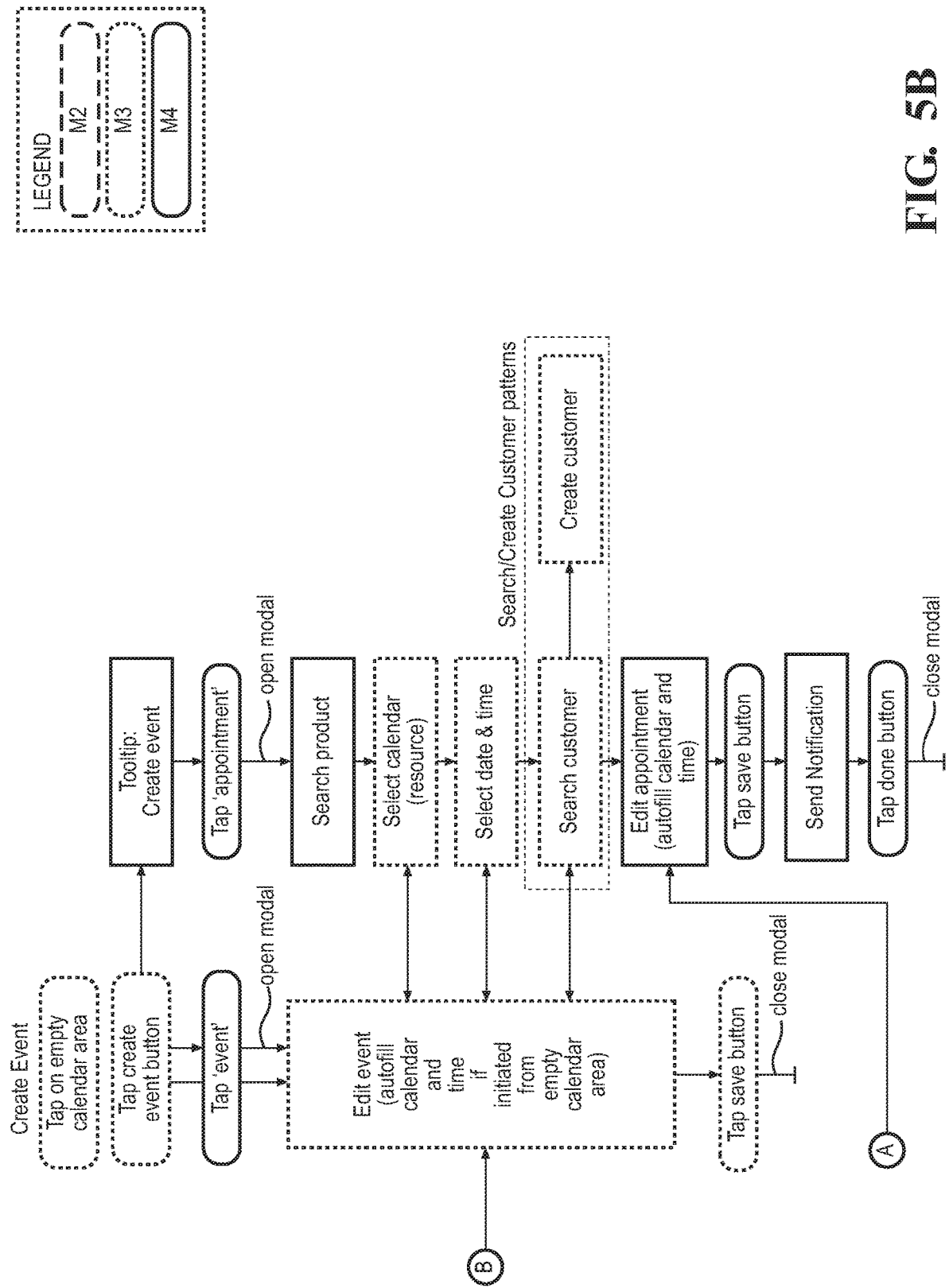

FIGS. 5A-C depict an embodiment calendar functional process flow associated with viewing appointment details, creating calendar events, and viewing calendar event details. In embodiments, a process flow for viewing appointment details may include tapping on an appointment to reveal appointment detail selections, such as for checkout, appointment no-shows (e.g., cancelling the appointment and showing the customer as a no-show), editing the appointment detail (e.g., dropping down into a creating calendar events flow for editing appointments), cancelling an appointment (e.g., cancelling and sending a notification to the customer), closing the appointment details, and the like. In embodiments, a process flow for creating calendar events may include tapping on an empty calendar area in a calendar view, tapping a create calendar event view, and the like, such as leading to a flow including a tool tip view for creating a calendar event, selections for creating an appointment or calendar event, searching for a product, selecting a calendar resource, selecting a date and time, searching for an existing customer or creating a new customer, editing an appointment, saving an appointment, sending a notification, and the like. In embodiments, a process flow for viewing calendar event details may include tapping on an existing calendar event and viewing details, such as with selection links into the creating calendar event detail process flow.

Figure 6B:

FIGS. 6A-C depict embodiment time-line movement views of agenda states within a calendar view of daily appointments, with FIG. 6A showing a present time, FIG. 6B showing a scrolling to past time, and FIG. 6C showing a scrolling to future time. FIG. 6D shows an embodiment of a blank calendar with no calendar events shown and to which calendar events may be added. FIG. 7 depicts an authorization flow associated with connecting to a third-party calendar, such as starting from a calendar entry point in a calendar view, transitioning to an administrator authorization flow, and when authorized, to a calendar view showing stored calendar content within the third-party calendar.

Figure 8A:
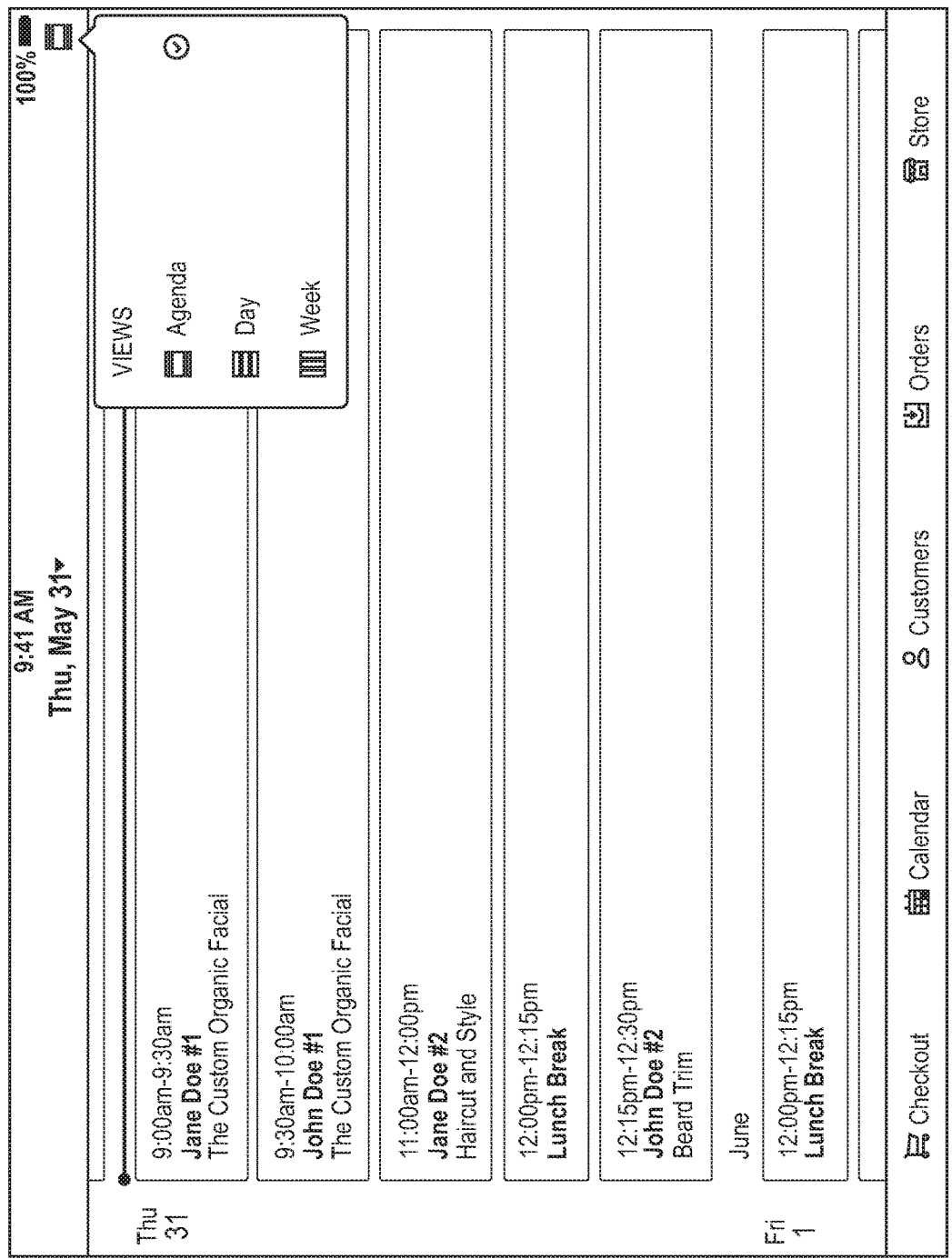
Figure 8B:
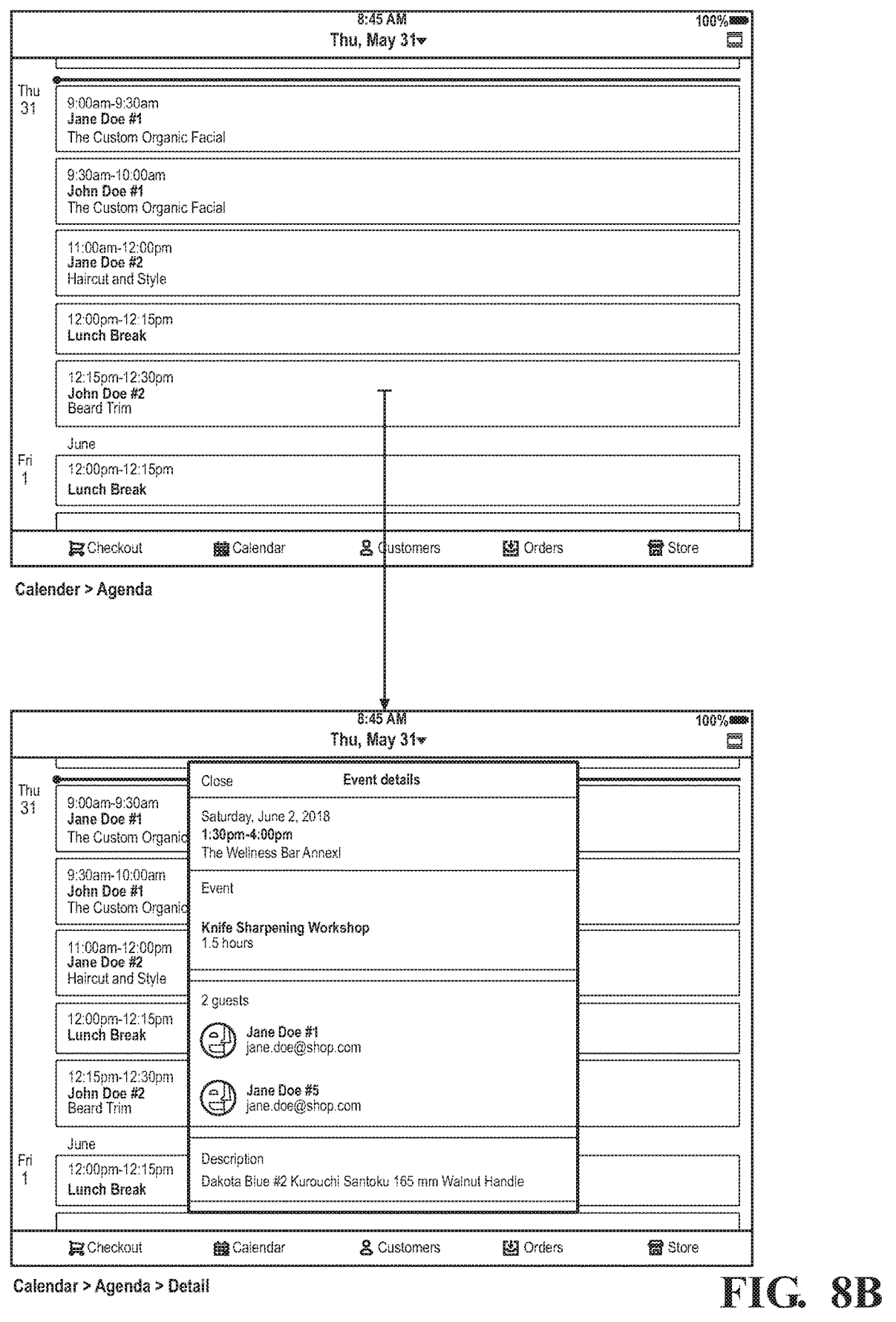
Figure 8C:
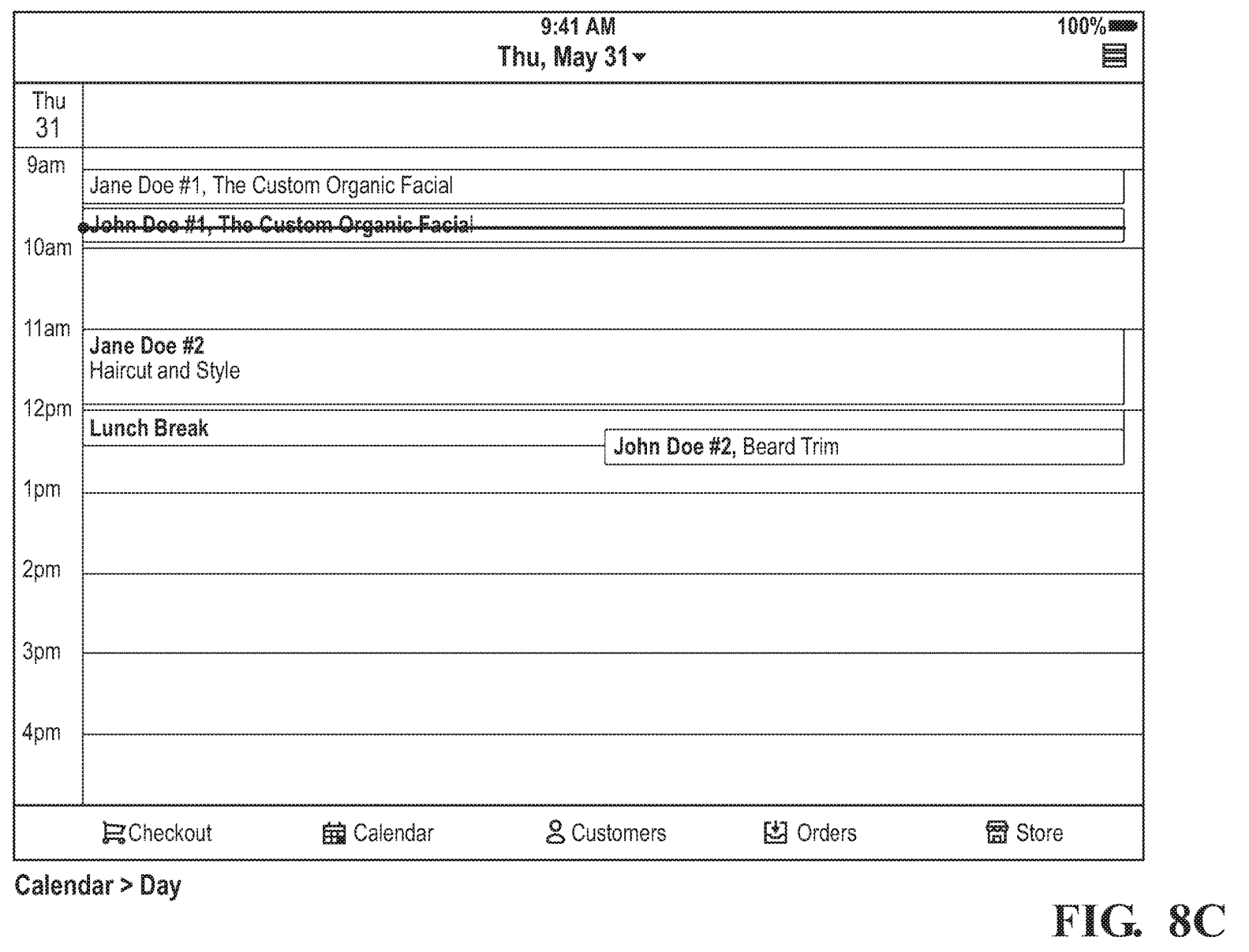
Figure 8D:
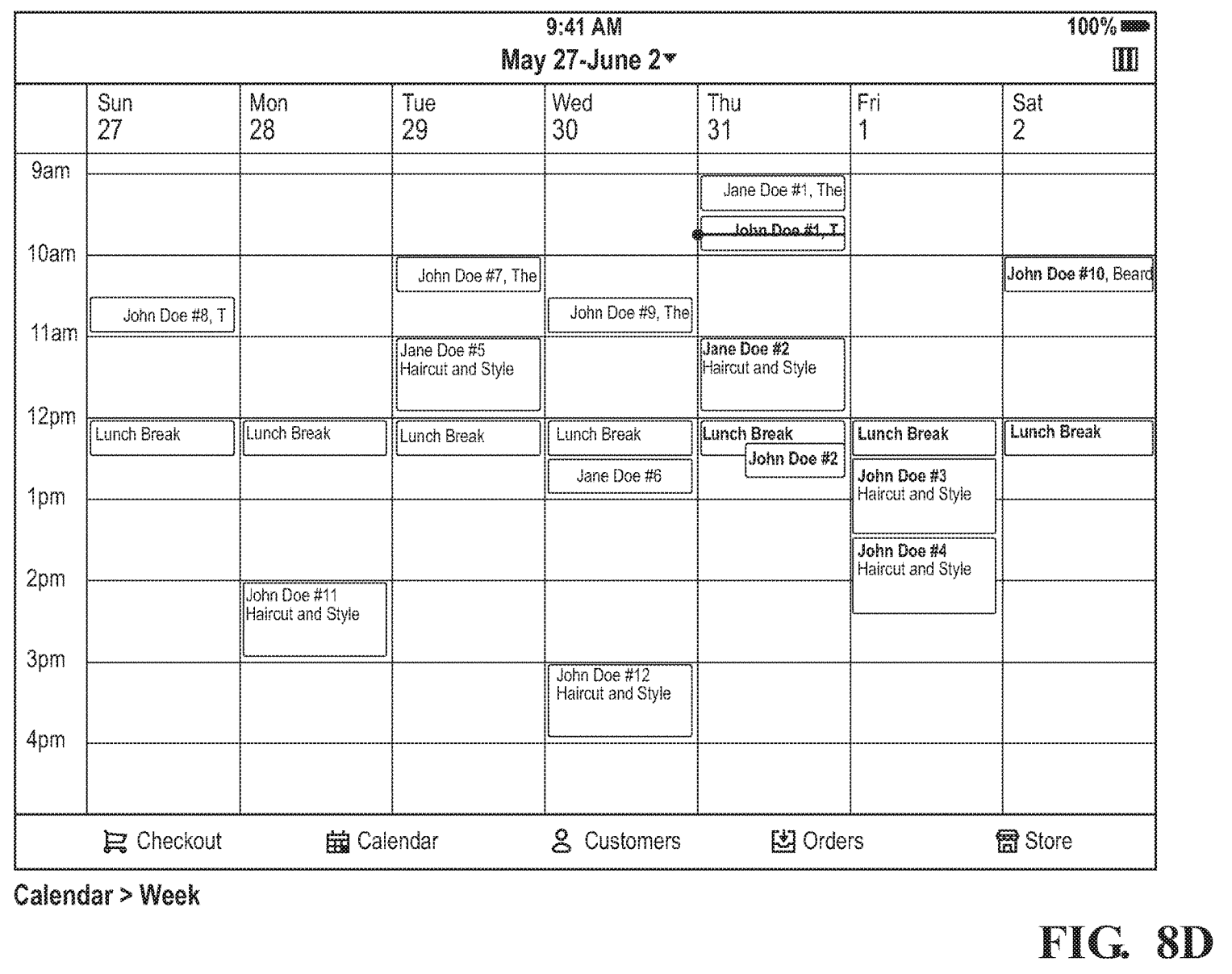

FIGS. 8A-D depict embodiment calendar event detail views, where FIG. 8A depicts a calendar view event detail of a navigation bar tool tip dropdown menu, such as for agenda and date; FIG. 8B depicts a calendar detail view selected from a calendar view; FIG. 8C depicts a day view of a calendar view; and FIG. 8D shows a week view of a calendar view.

Figure 9A:
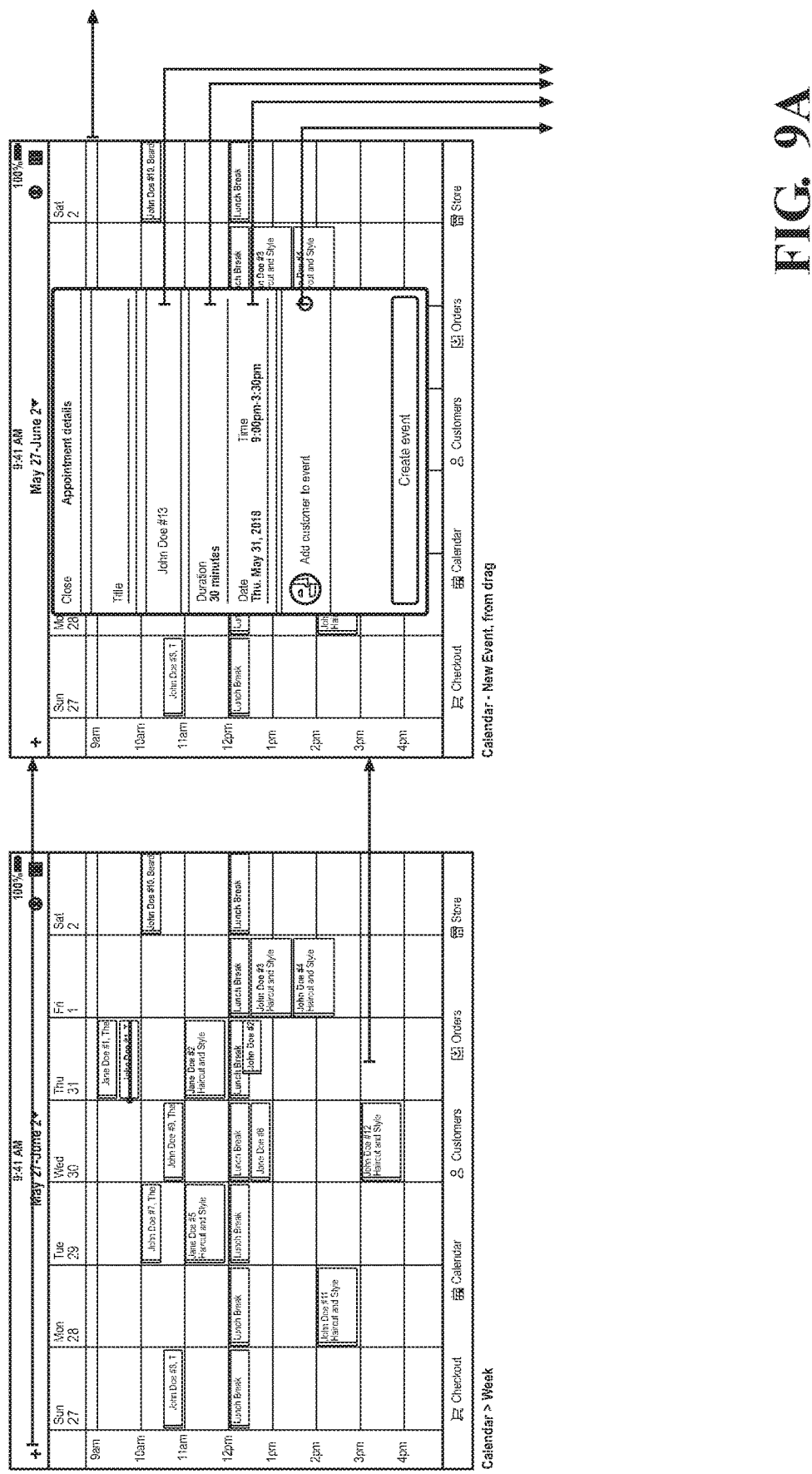
Figure 10A:
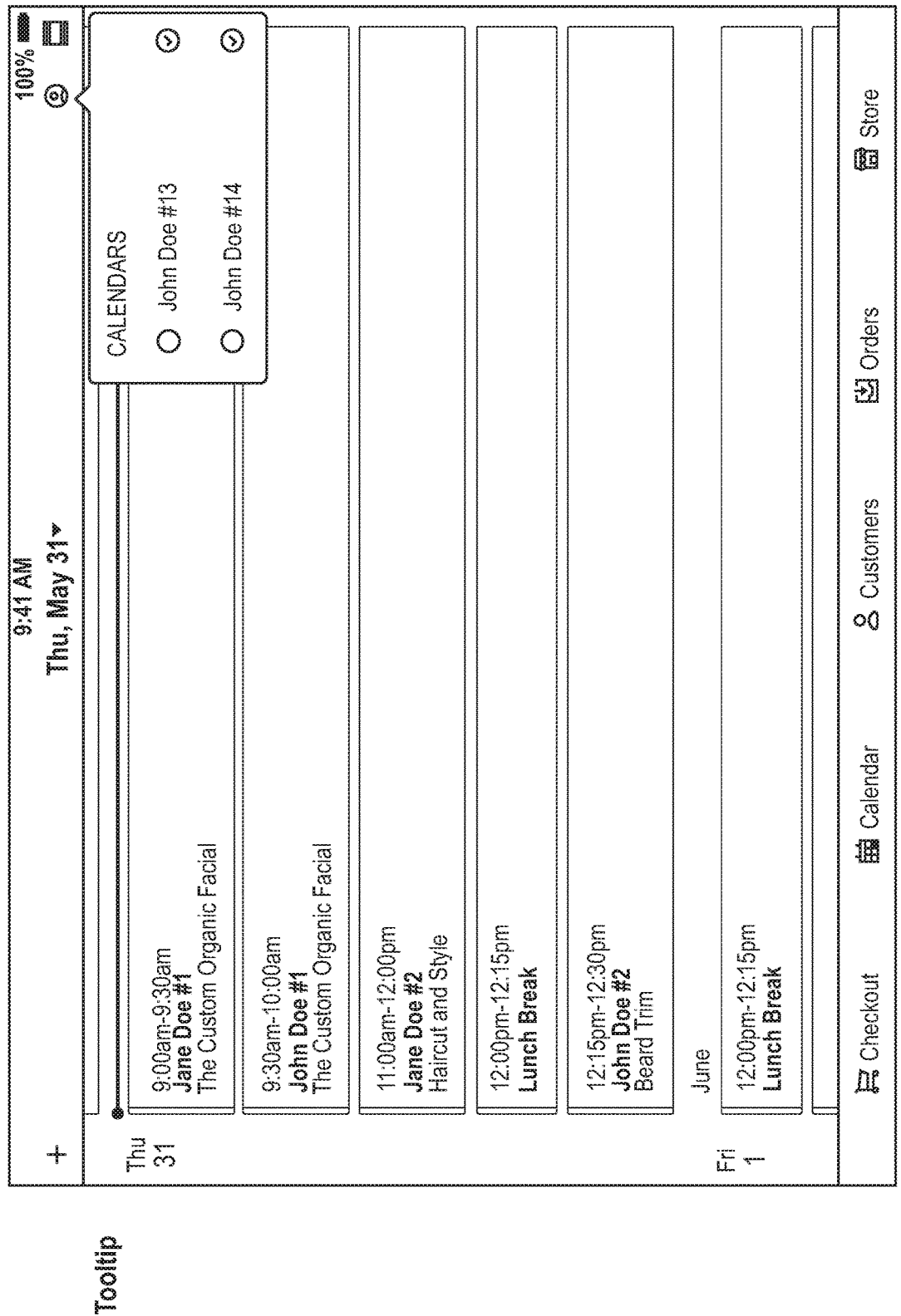
Figure 10B:
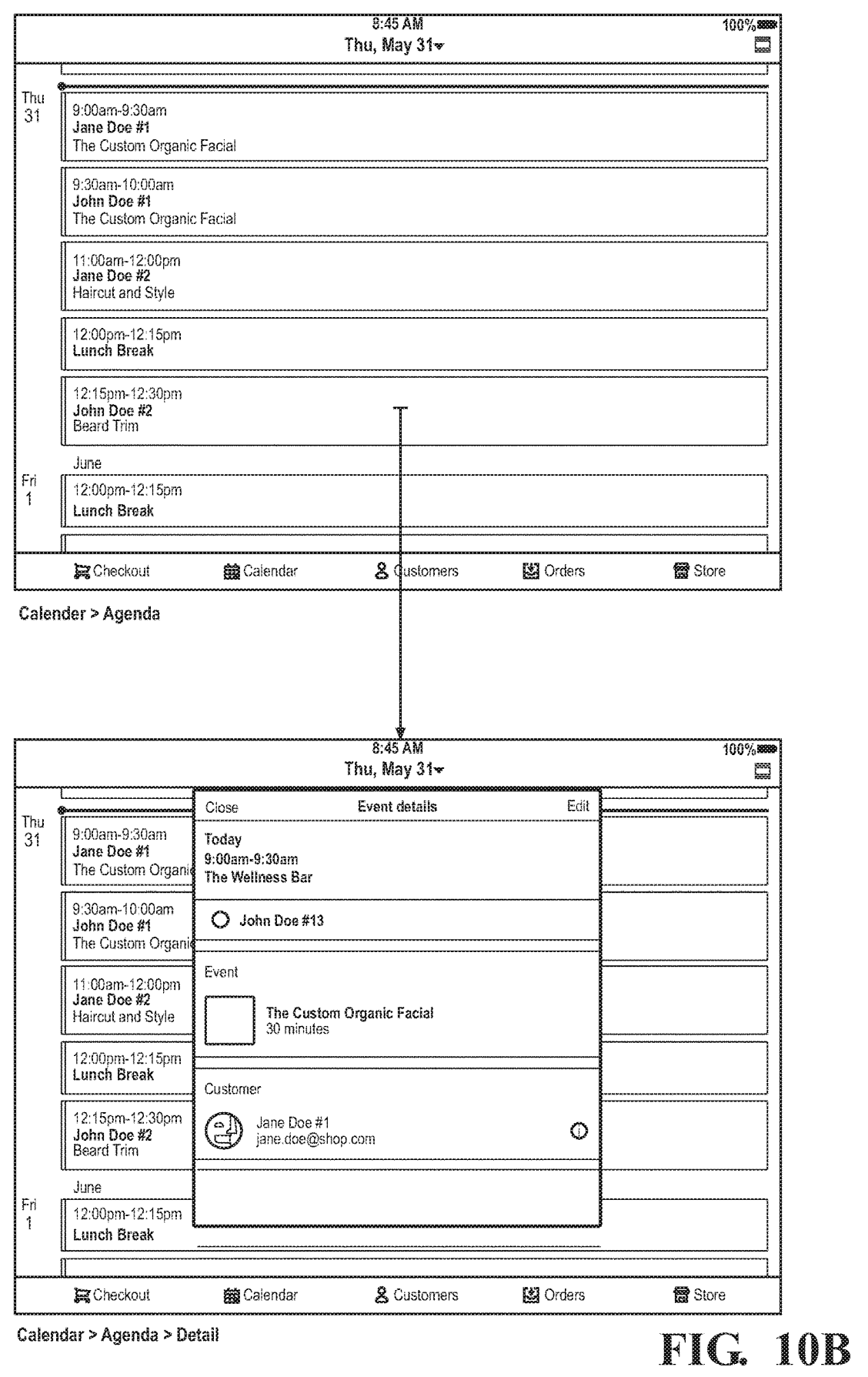
Figure 10C:
Figure 10D:
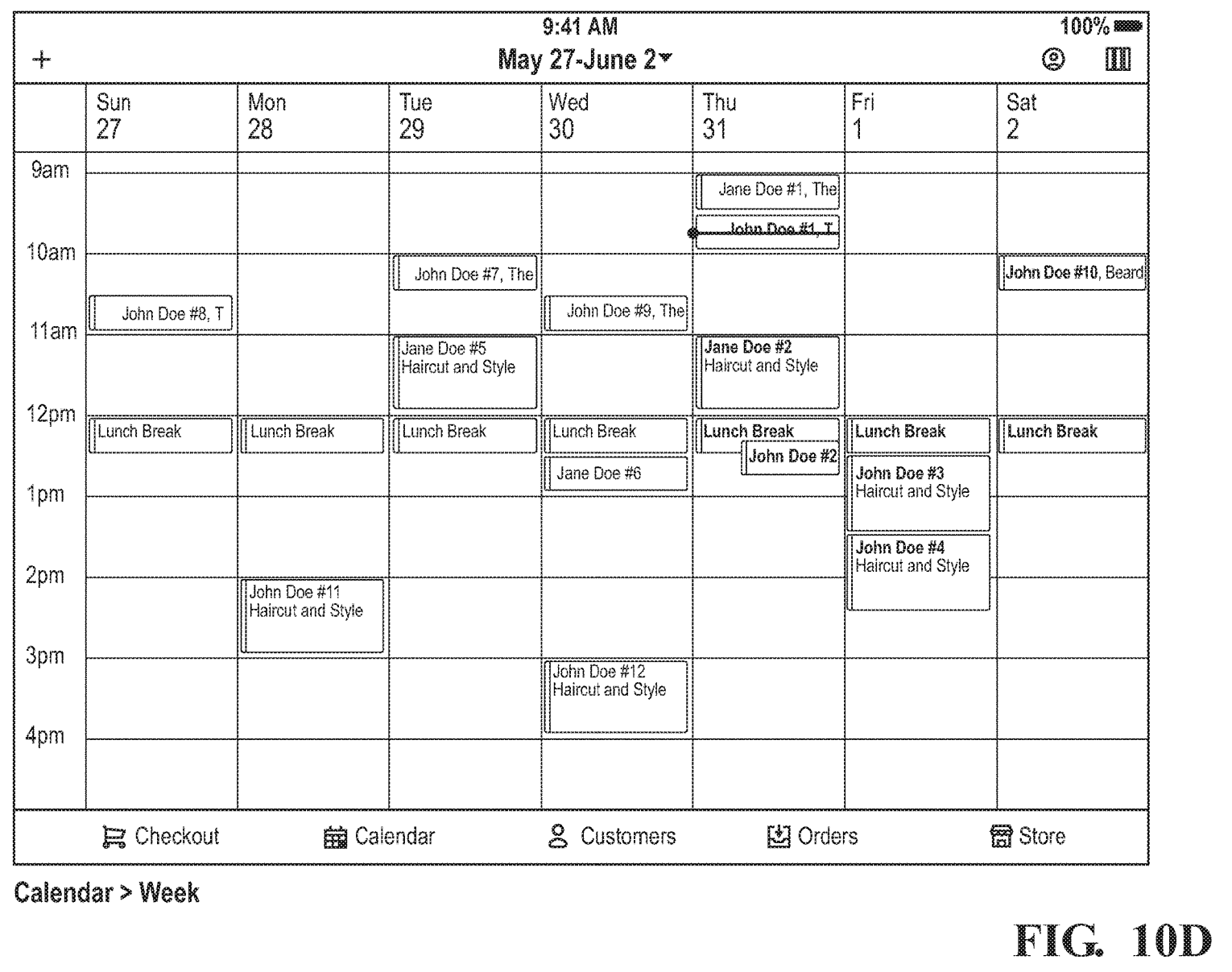

FIGS. 9A-B depict embodiment event creation views, where FIG. 9A depicts a calendar event creation initiation step in a calendar view which opens a dialog box for creating the calendar event through a variety of detail selection points, with FIG. 9B illustrating further detail flow to the detail selection points. FIGS. 10A-D depict further embodiment calendar event creation views, where FIG. 10A depicts a navigation bar tool tip view for viewing different customers, FIG. 10B depicts a calendar detail view selected from a calendar view, FIG. 10C depicts a day view of a calendar, and FIG. 10D shows a week view of a calendar.

Figure 11B:
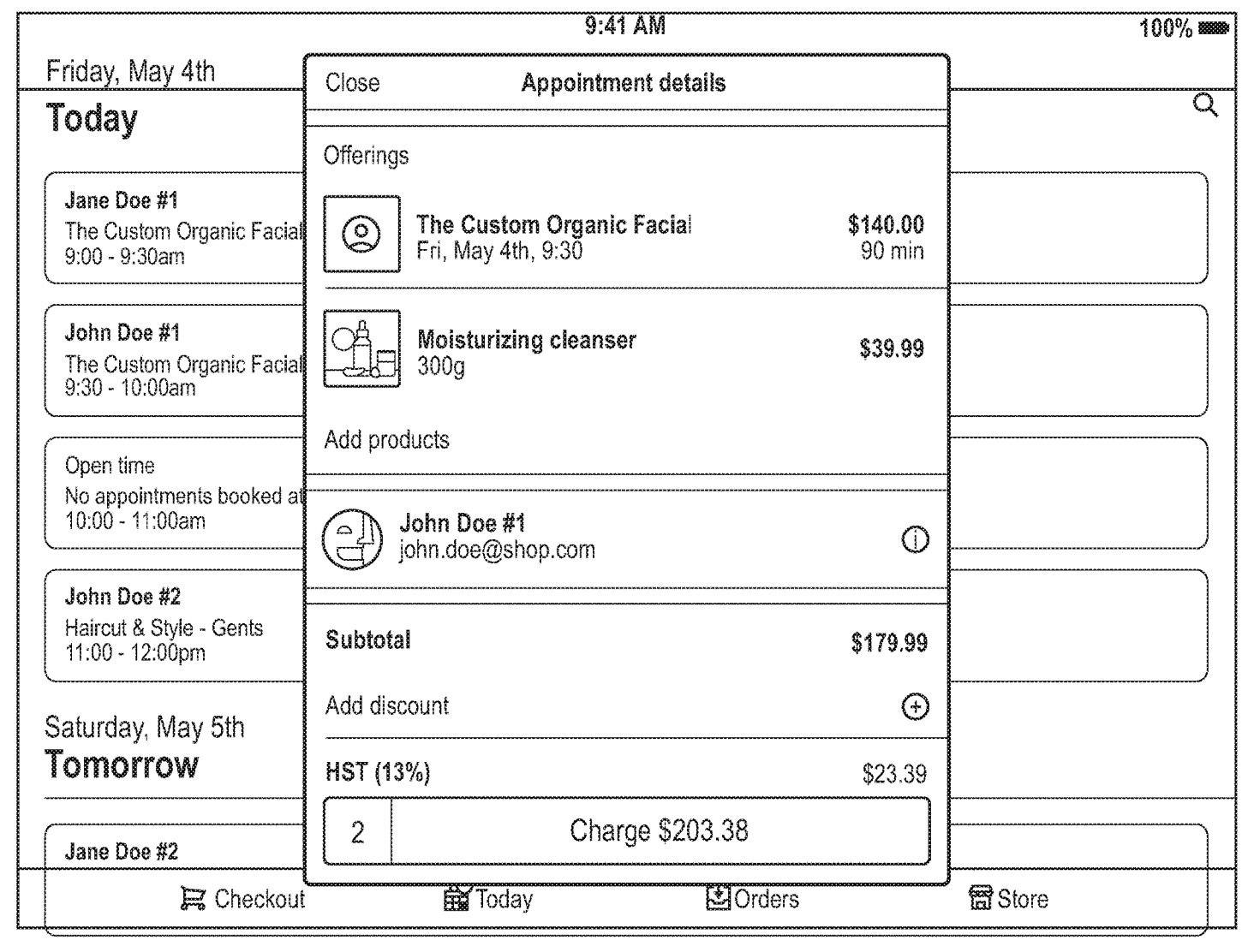

In embodiments, FIGS. 11A-C may illustrate the connection between scheduling time and products together, where FIG. 11A shows a customer profile selected through a calendar view that depicts past visits, preferred products, appointments, and past orders and payments; FIG. 11B shows appointment details specifying a facial service and cost, a moisturizing cleanser product and cost, and total cost for checkout with tax; FIG. 11C shows a timeline of notes indicating order receipts, appointment times, reminders, and indication that the POS device automatically added the customer's email to the customer profile.

Figure 12A:
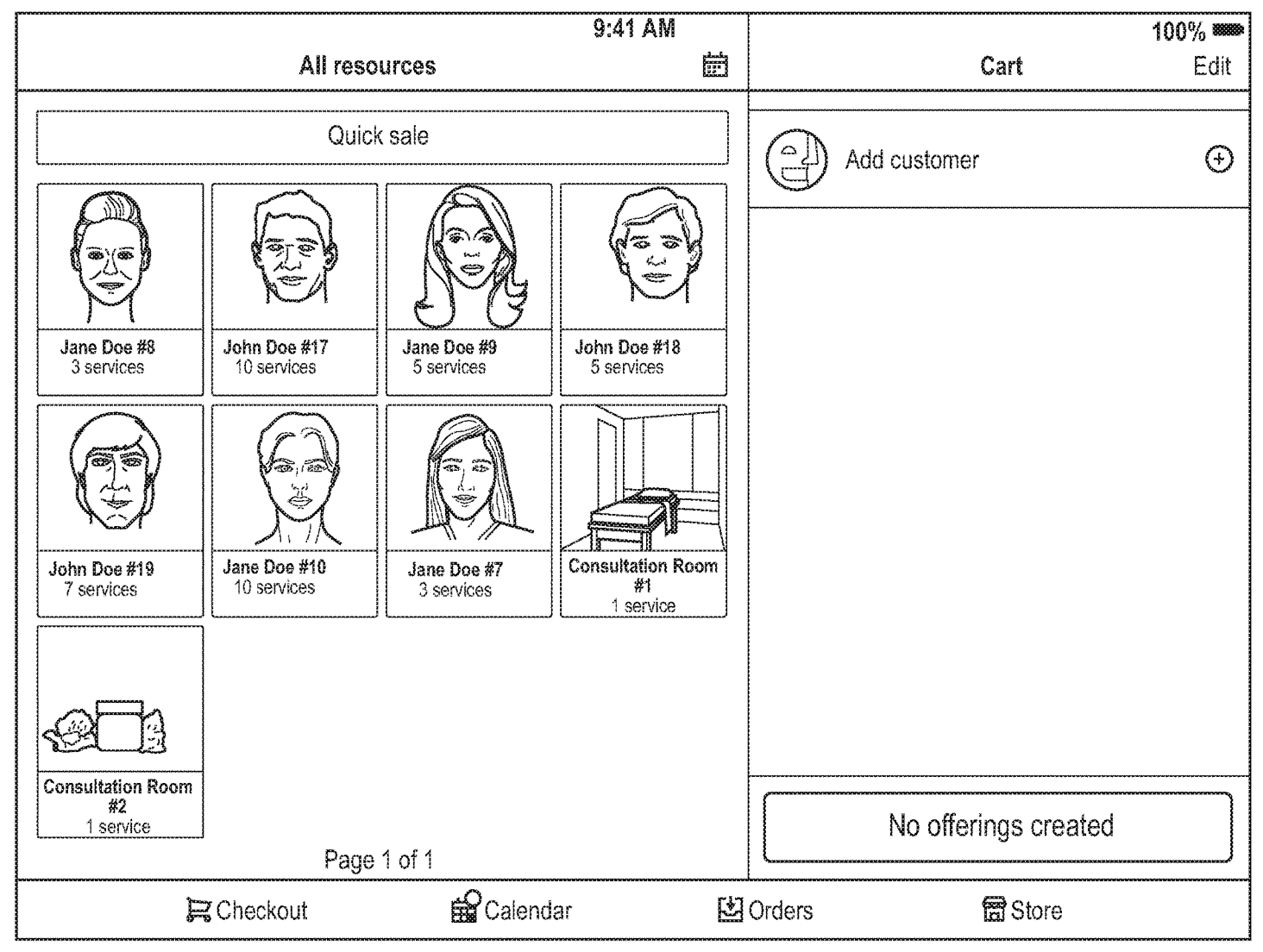
Figure 12B:
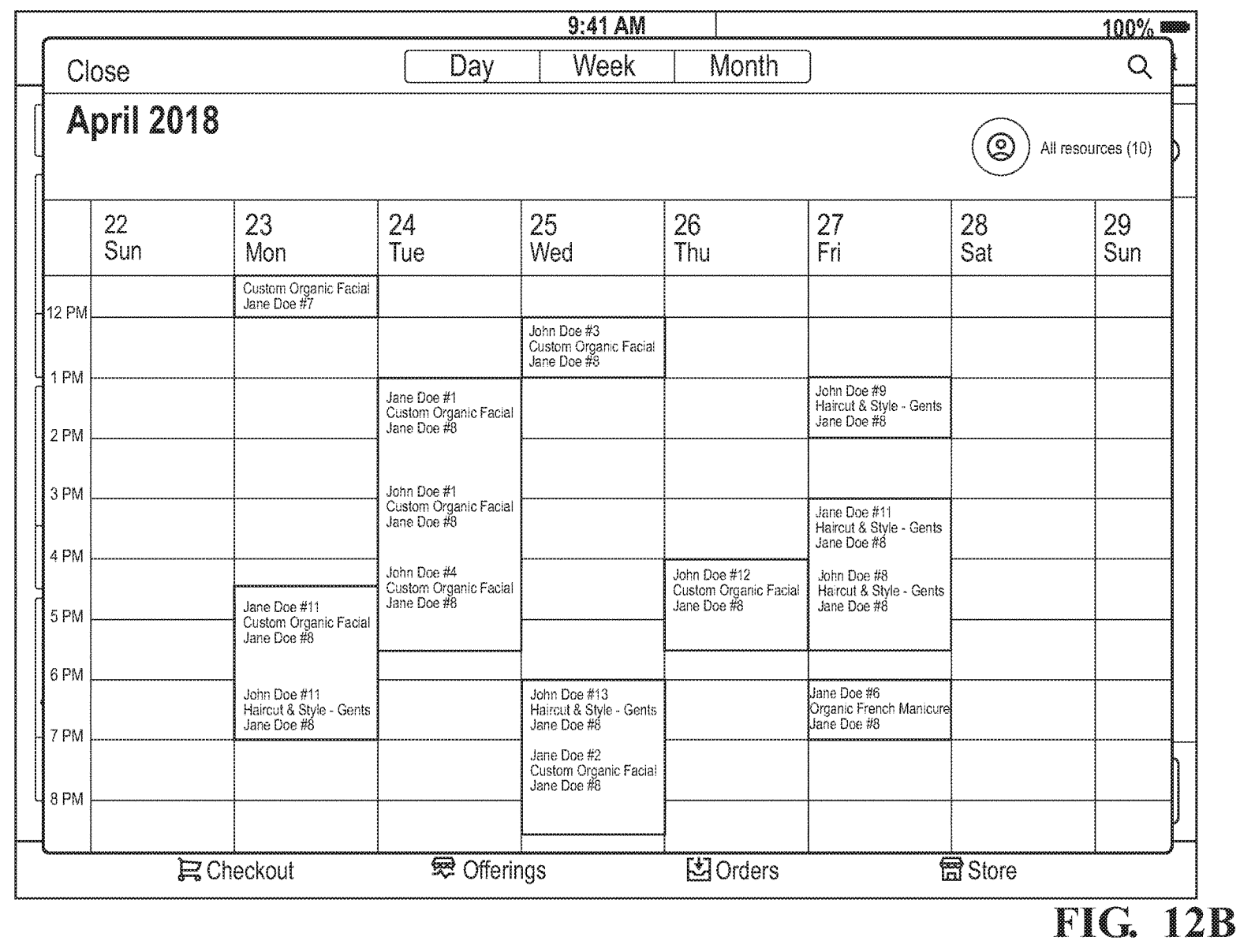
Figure 12C:
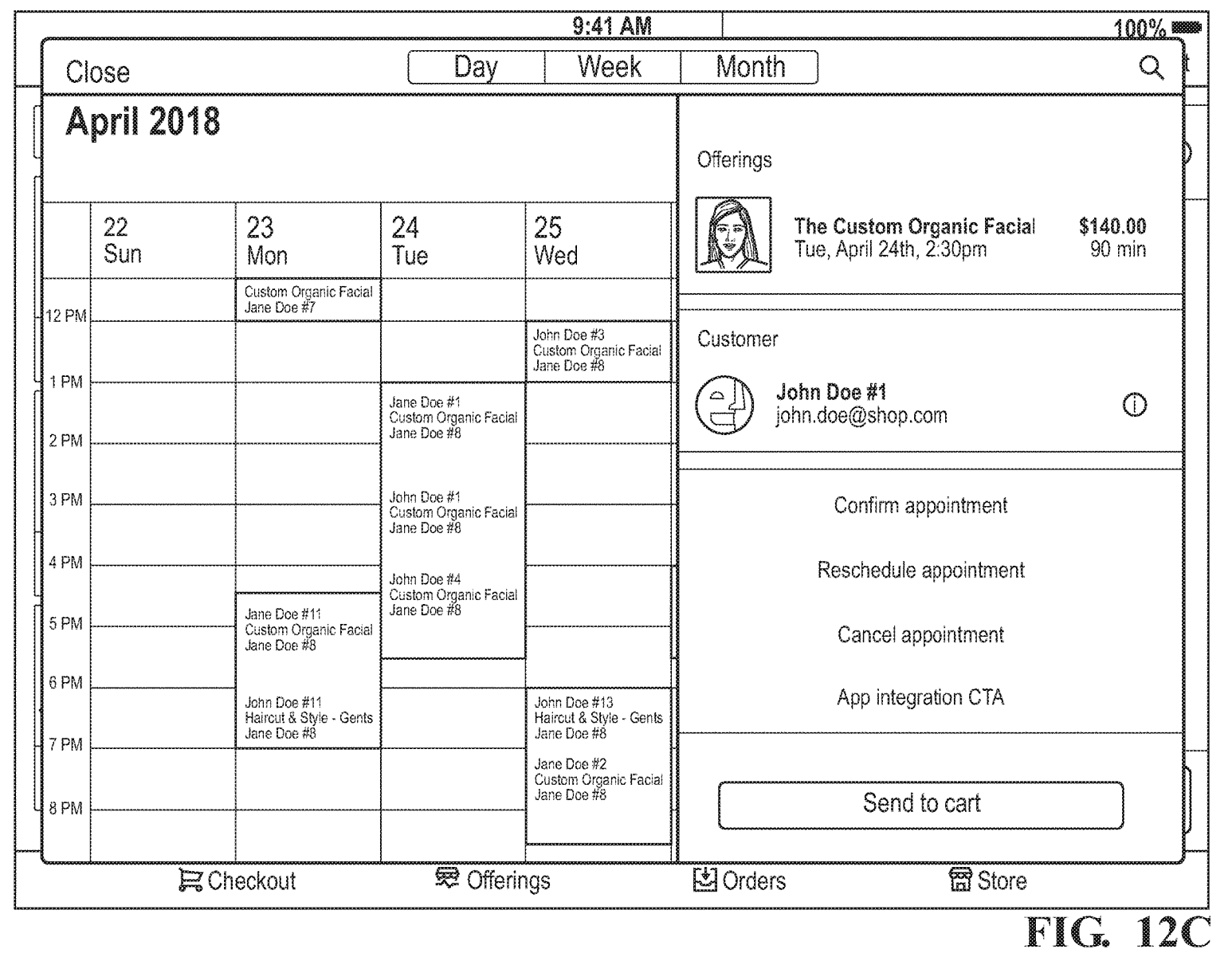
Figure 12D:
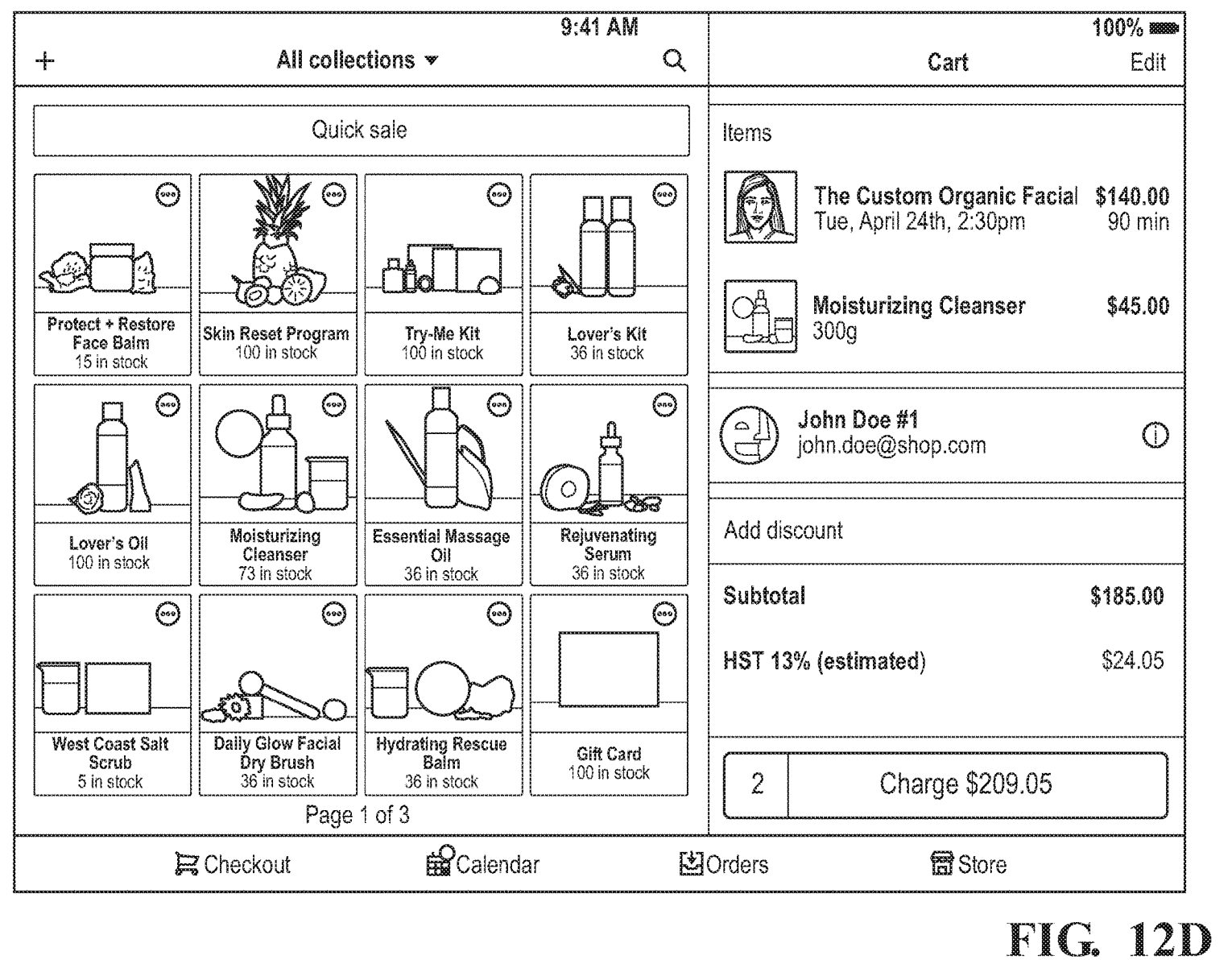
Figure 12E:
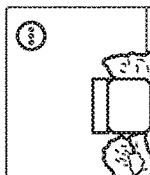
Figure 12F:
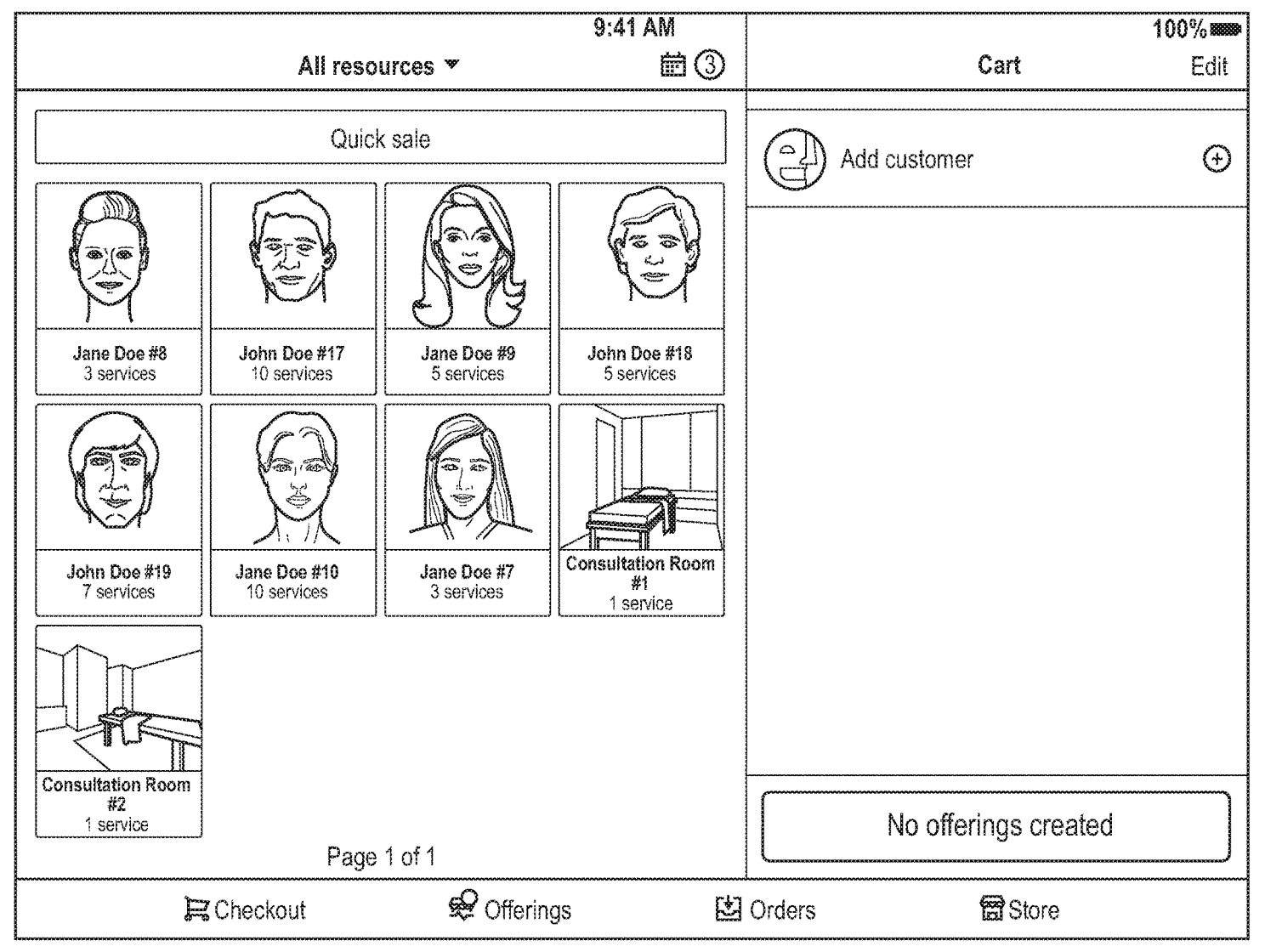
Figure 12G:
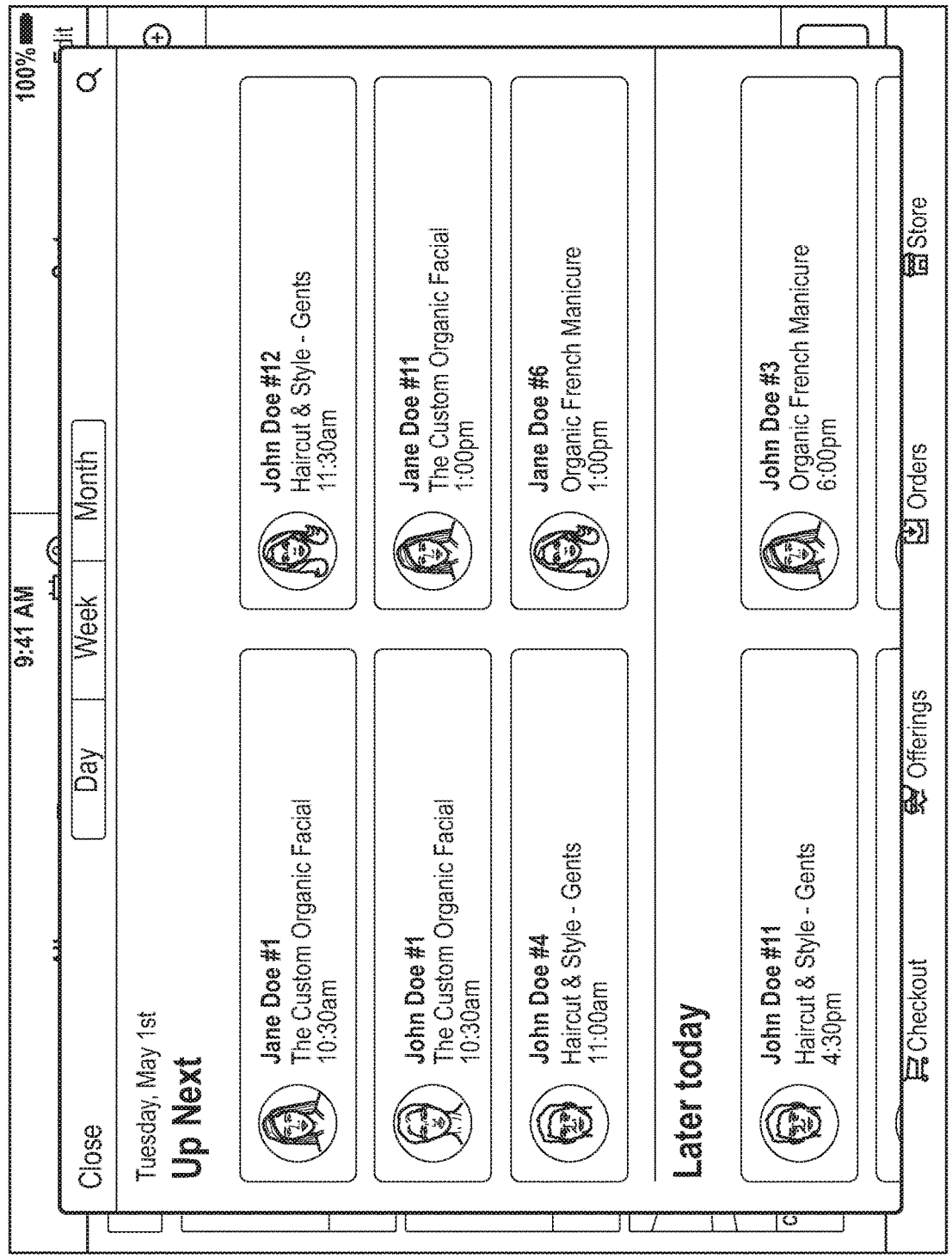
Figure 12H:
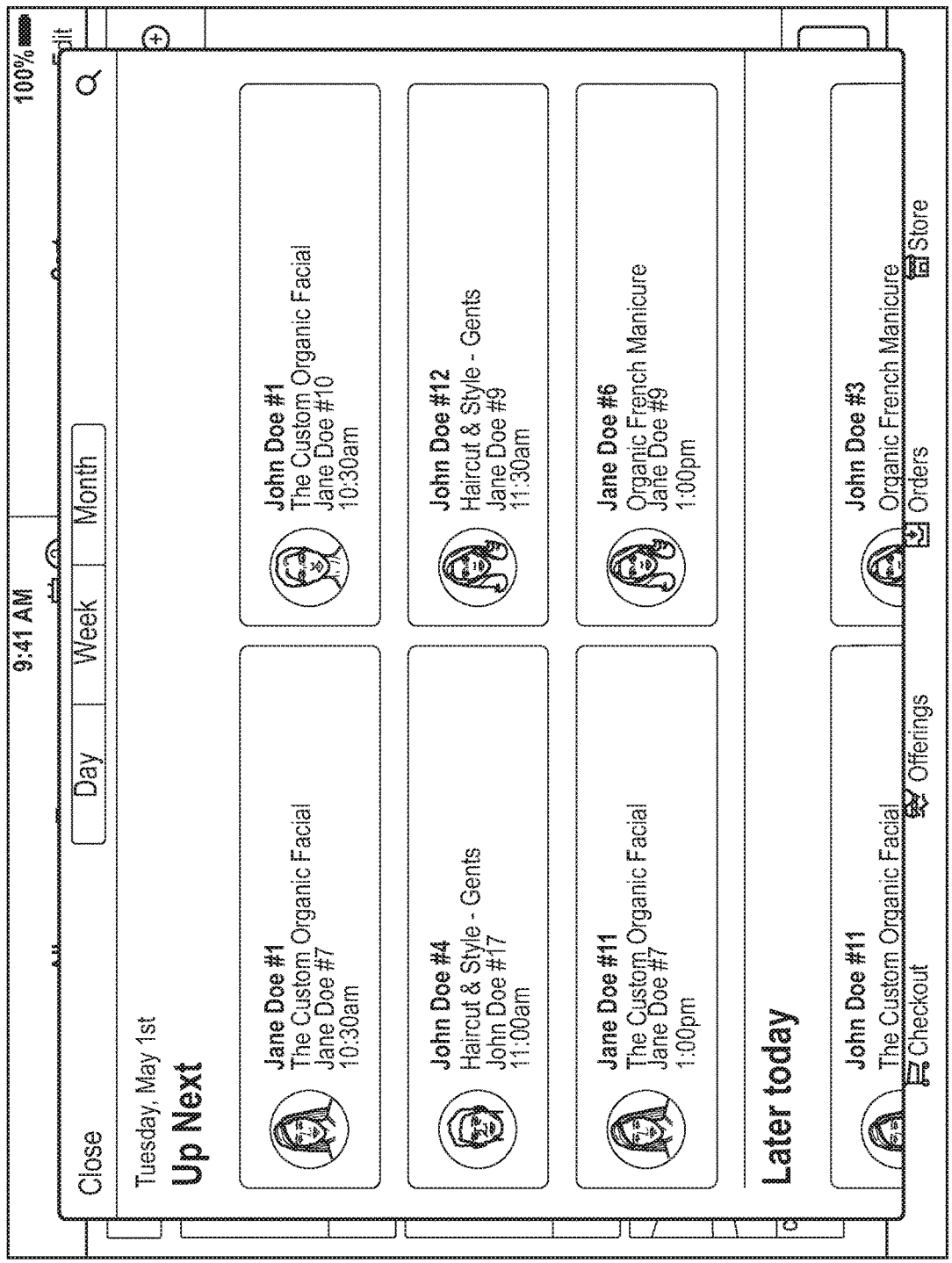
Figure 12I:
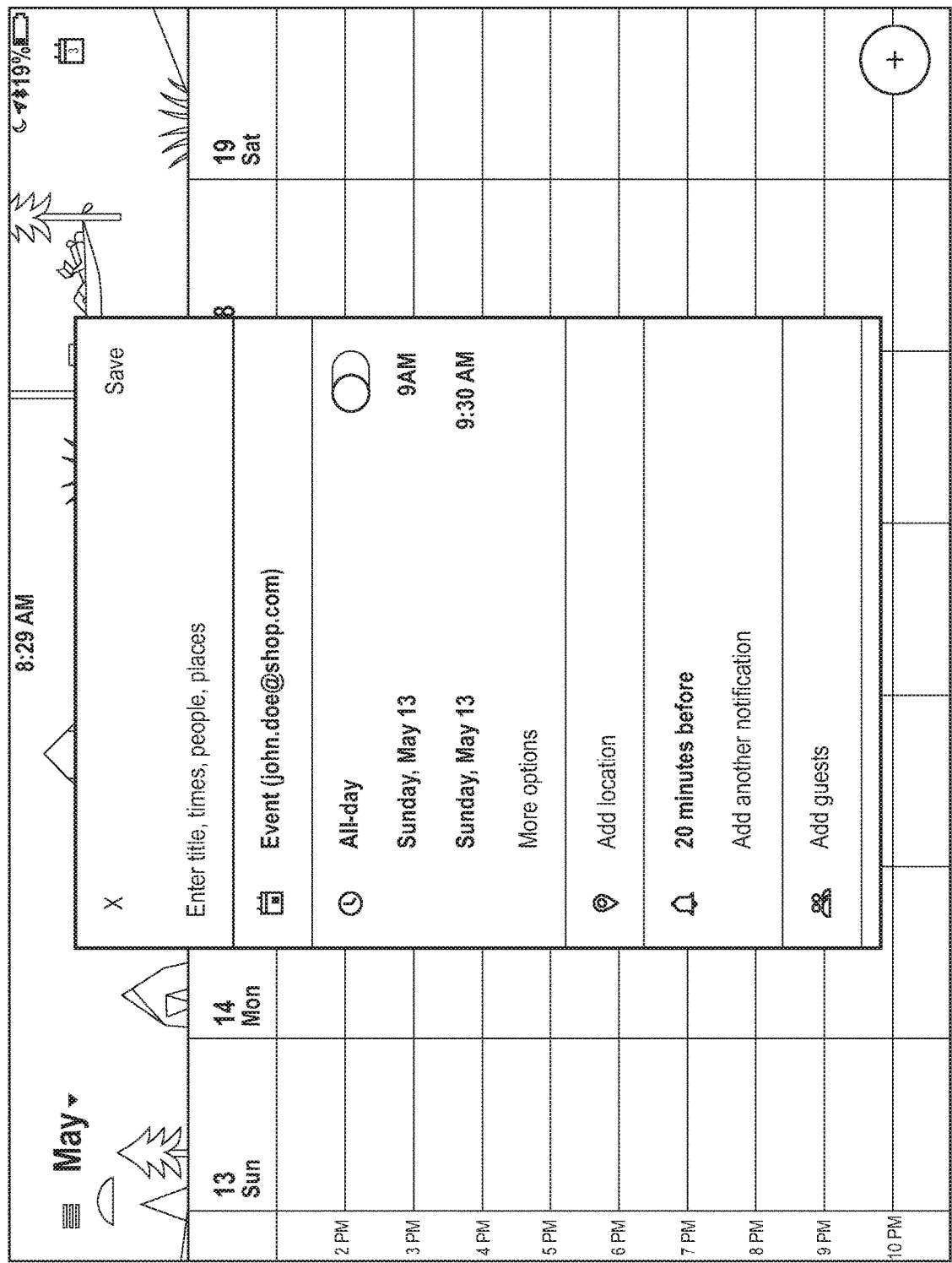
Figure 12J:
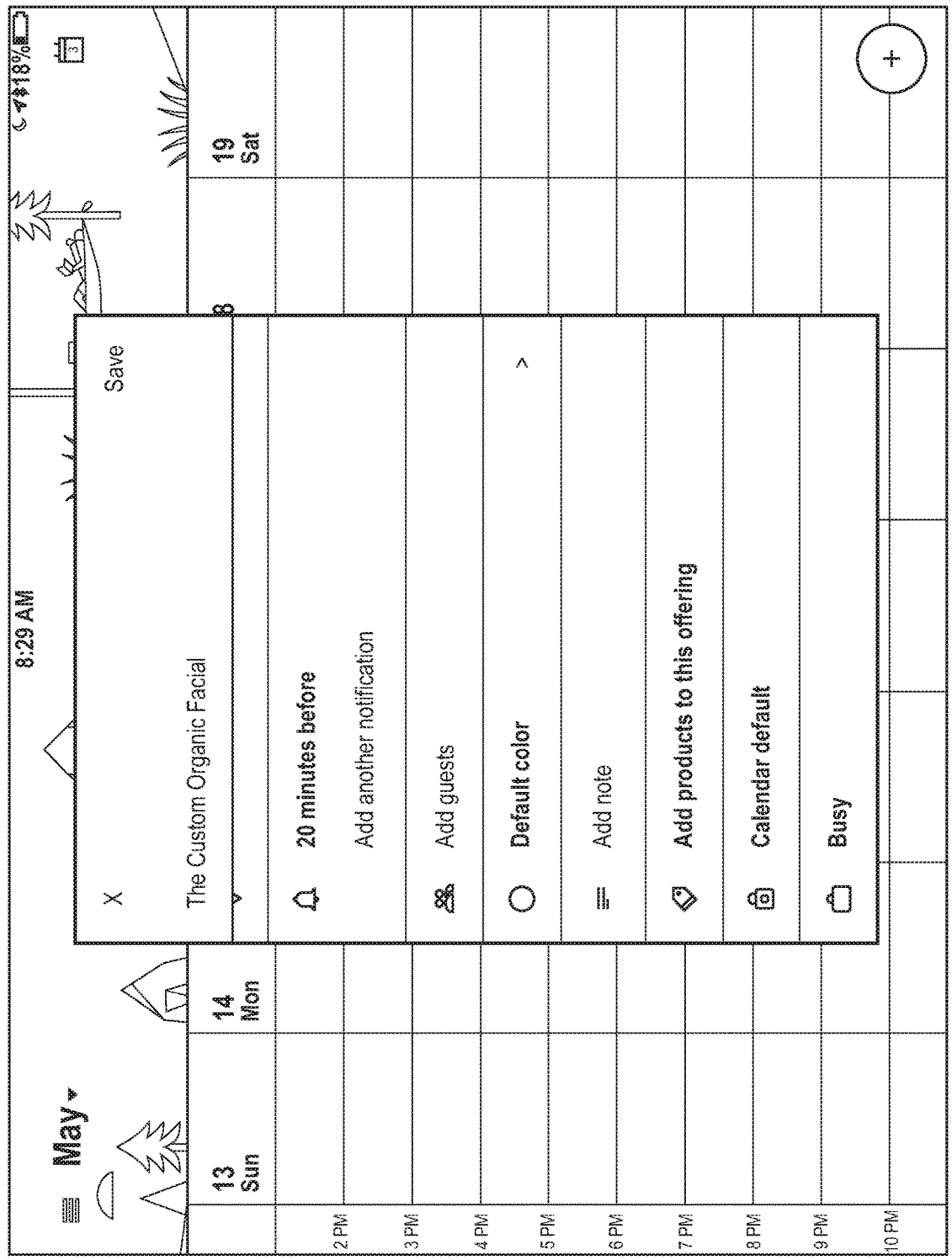
Figure 12L:
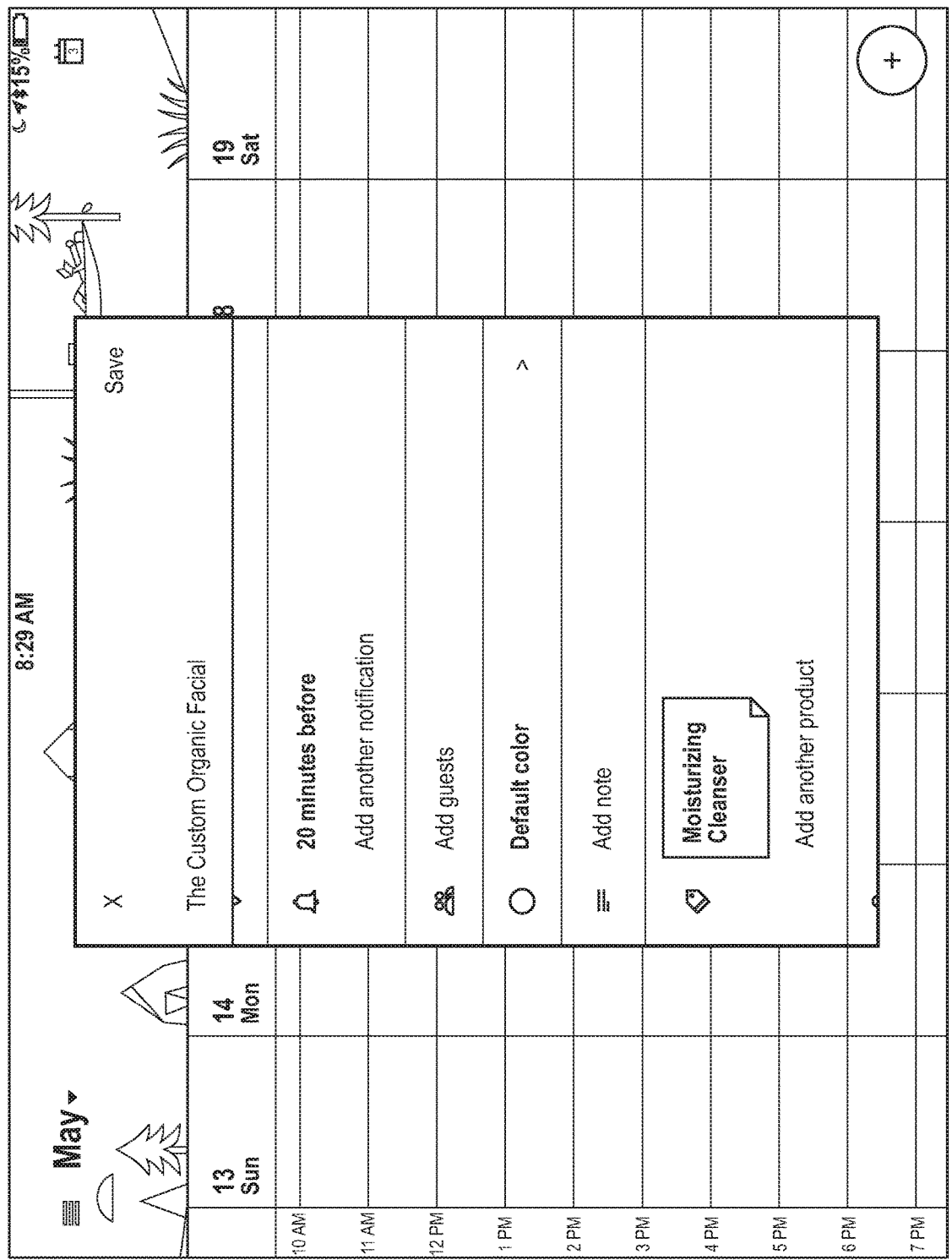

In embodiments, FIGS. 12A-12L may illustrate embodiment views of the calendar in association with scheduling and tracking resources through appointments and checkout, including FIG. 12A with views and services of customers along with the assignment of a consultation room; FIG. 12B with a monthly calendar view; FIG. 12C with a customer detail showing the cost for a facial service and decision selections for confirming, rescheduling, and cancelling an appointment; FIG. 12D with a view of both service (a facial) and products (a cleanser) together in a checkout cart with payment processing information presented (total cost of the service and product with tax); both FIGS. 12D-E with views of products for a quick sale and a selection list and price for various items along with a total cost for the transaction including tax at checkout; 12F with a view for adding a customer; FIGS. 12G-H with views of upcoming appointments; and FIGS. 12I-L with views showing appointment details and selection options for adding products.

The methods and systems, including the customer experience resource facility 200, described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems, including the customer experience resource facility 200, described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems, including the customer experience resource facility 200, described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes (including the customer experience resource facility 200) described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method, comprising:
receiving, by a computing device during a customer experience, an input identifying a time-based resource to be scheduled, wherein the time-based resource is associated with a first purchase;
receiving, by the computing device during the customer experience, an input identifying a product-based resource, wherein the product-based resource is associated with a second purchase;
presenting, by the computing device, a checkout cart including both the time-based resource to be scheduled and the product-based resource to be purchased;
processing a payment for the checkout cart in respect of the product-based resource using a payment processing facility; and
scheduling the time-based resource, wherein the scheduling triggers the creation of a calendar event corresponding to the time-based resource as scheduled.

2. The computer-implemented method of claim 1 wherein the product-based resource is associated with the time-based resource.

3. The computer-implemented method of claim 1 wherein scheduling the time-based resource includes scheduling at least one of a personnel-based resource and a location-based resource.

4. The computer-implemented method of claim 1 wherein some or all of the input is received by an application program interface.

5. The computer-implemented method of claim 1, further comprising:
presenting the calendar event, wherein the presented calendar event depicts the time-based resource and the product-based resource in a calendar view presentation.

6. The computer-implemented method of claim 1 wherein the calendar event is created on the computing device.

7. The computer-implemented method of claim 1 wherein creation of the calendar event triggers the creation of a workflow sequence associated with execution of the time-based resource and the product-based resource.

8. The computer-implemented method of claim 1 wherein creation of the calendar event triggers the creation of a second calendar event.

9. The method of claim 1 wherein the calendar event is associated with the scheduled time-based resource and the product-based resource.

10. The computer-implemented method of claim 1 wherein the first purchase is a cost during a future customer experience.

11. A system comprising:
a computing device configured to store a set of instructions that, when executed, cause the computing device to:
receive an input during a customer experience identifying a time-based resource to be scheduled, wherein the time-based resource is associated with a first purchase;
receive an input during the customer experience identifying a product-based resource, wherein the product-based resource is associated with a second purchase;
present a checkout cart including both the time-based resource to be scheduled and the product-based resource to be purchased;
process a payment for the checkout cart in respect of the product-based resource using a payment processing facility; and
schedule the time-based resource, wherein the scheduling triggers the creation of a calendar event corresponding to the time-based resource as scheduled.

12. The system of claim 11 wherein the product-based resource is associated with the time-based resource.

13. The system of claim 11 wherein the computing device is a point-of-sale device.

14. The system of claim 11 wherein scheduling the time-based resource includes scheduling at least one of a personnel-based resource and a location-based resource.

15. The system of claim 11 wherein some or all of the input is received by an application program interface.

16. The system of claim 11 wherein the instructions, when executed, further cause the computing device to:
present the calendar event, wherein the presented calendar event depicts the time-based resource and the product-based resource in a calendar view presentation.

17. The system of claim 11 wherein the calendar event is created on the computing device.

18. The system of claim 11 wherein creation of the calendar event triggers the creation of a workflow sequence associated with execution of the time-based resource and the product-based resource.

19. The system of claim 11 wherein creation of the calendar event triggers the creation of a second calendar event.

20. The system of claim 11 wherein the calendar event is associated with the scheduled time-based resource and the product-based resource.

21. A non-transitory computer-readable storage medium storing a set of instructions that, when executed by a processor of a computing device, cause the computing device to:
receive an input during a customer experience identifying a time-based resource to be scheduled, wherein the time-based resource is associated with a first purchase;
receive an input during the customer experience identifying a product-based resource, wherein the product-based resource is associated with a second purchase;
present a checkout cart including both the time-based resource to be scheduled and the product-based resource to be purchased;
process a payment for the checkout cart in respect of the product-based resource using a payment processing facility; and
schedule the time-based resource, wherein the scheduling triggers the creation of a calendar event corresponding to the time-based resource as scheduled.

22. The computer-readable medium of claim 21 wherein the product-based resource is associated with the time-based resource.

23. The computer-readable medium of claim 21 wherein the computing device is a point-of-sale device.

24. The computer-readable medium of claim 21 wherein scheduling the time-based resource includes scheduling at least one of a personnel-based resource and a location-based resource.

25. The computer-readable medium of claim 21 wherein some or all of the input is received by an application program interface.

26. The computer-readable medium of claim 21 wherein the instructions, when executed, further cause the computing device to:
present the calendar event, wherein the presented calendar event depicts the time-based resource and the product-based resource in a calendar view presentation.

27. The computer-readable medium of claim 21 wherein the calendar event is created on the computing device.

28. The computer-readable medium of claim 21 wherein creation of the calendar event triggers the creation of a workflow sequence associated with execution of the time-based resource and the product-based resource.

29. The computer-readable medium of claim 21 wherein creation of the calendar event triggers the creation of a second calendar event.

30. The computer-readable medium of claim 21 wherein the calendar event is associated with the scheduled time-based resource and the product-based resource.

* * * * *